(12) United States Patent
Chappell et al.

(10) Patent No.: US 12,492,625 B1
(45) Date of Patent: Dec. 9, 2025

(54) INTEGRATED JUNCTION AND CHECK VALVE ASSEMBLIES FOR HYDRAULIC FRACTURING SYSTEM MANIFOLDS AND RELATED METHODS

(71) Applicant: Scout Surface Solutions LLC, Joshua, TX (US)

(72) Inventors: John A. Chappell, Joshua, TX (US); Kirk P. Guidry, Joshua, TX (US)

(73) Assignee: Scout Surface Solutions LLC, Joshua, TX (US)

( * ) Notice: Subject to any disclaimer, the term of this patent is extended or adjusted under 35 U.S.C. 154(b) by 0 days.

(21) Appl. No.: 19/096,473

(22) Filed: Mar. 31, 2025

Related U.S. Application Data

(63) Continuation-in-part of application No. 29/990,251, filed on Feb. 20, 2025, and a continuation-in-part of application No. 29/990,254, filed on Feb. 20, 2025.

(51) Int. Cl.
*E21B 43/26* (2006.01)
*F15B 13/08* (2006.01)

(52) U.S. Cl.
CPC ...... *E21B 43/2607* (2020.05); *F15B 13/0807* (2013.01); *F15B 13/0878* (2013.01)

(58) Field of Classification Search
CPC .............. E21B 43/2607; F15B 13/0807; F15B 13/0878
See application file for complete search history.

(56) References Cited

U.S. PATENT DOCUMENTS

| | | | |
|---|---|---|---|
| 5,018,769 A | 5/1991 | Albrecht | |
| 8,695,693 B2 | 4/2014 | Nguyen et al. | |
| 8,794,306 B2 | 8/2014 | Cote et al. | |
| 8,851,182 B2 | 10/2014 | Nguyen et al. | |
| 8,899,315 B2 | 12/2014 | Nguyen et al. | |
| 8,944,159 B2 | 2/2015 | Guidry et al. | |
| 8,960,307 B2 | 2/2015 | Cain et al. | |
| 8,978,763 B2 | 3/2015 | Guidry | |

(Continued)

FOREIGN PATENT DOCUMENTS

| | | |
|---|---|---|
| CA | 2638434 | 1/2010 |
| CN | 217401115 | 9/2022 |

(Continued)

OTHER PUBLICATIONS

USPTO Invitation to Pay Additional Fees for PCT/US2023/084996, Mar. 6, 2024.

(Continued)

*Primary Examiner* — Brad Harcourt
(74) *Attorney, Agent, or Firm* — Womble Bond Dickinson (US) LLP

(57) ABSTRACT

Embodiments of a manifold of a hydraulic fracturing system include a junction having an inlet flow bore. The junction can include an integrated flow junction and valve check assembly having a body including a central portion and one or more side portions. The central portion can be positioned between a pair of manifold sections of the manifold and attached thereto. The one or more side portions extend radially from the central portion and include an inlet bore through which a pressurized fluid is received and supplied to the manifold. One or more check valves is positioned along the inlet bore so as to be integrated within the body of the junction.

18 Claims, 9 Drawing Sheets

(56) References Cited

U.S. PATENT DOCUMENTS

| | | |
|---|---|---|
| 9,045,960 B2 | 6/2015 | Vanderford et al. |
| 9,068,450 B2 | 6/2015 | Guidry |
| 9,115,562 B2 | 8/2015 | Guidry et al. |
| 9,133,677 B2 | 9/2015 | Cain et al. |
| 9,376,883 B2 | 6/2016 | Nguyen et al. |
| 9,382,774 B2 | 7/2016 | Vogel et al. |
| 9,416,614 B2 | 8/2016 | Cain et al. |
| 9,518,430 B2 | 12/2016 | Guidry |
| 9,677,698 B2 | 6/2017 | Nguyen et al. |
| 9,719,312 B2 | 8/2017 | Vanderford et al. |
| 9,850,743 B2 | 12/2017 | Harkins et al. |
| 9,869,150 B2 | 1/2018 | Cote et al. |
| 9,932,800 B2 | 4/2018 | Guidry |
| 9,976,372 B2 | 5/2018 | Guidry |
| 10,053,946 B2 | 8/2018 | Nguyen et al. |
| 10,094,195 B2 | 10/2018 | Guidry |
| 10,132,146 B2 | 11/2018 | Guidry |
| 10,138,697 B2 | 11/2018 | Guidry |
| 10,151,167 B2 | 12/2018 | Cain et al. |
| 10,156,122 B2 | 12/2018 | Nguyen et al. |
| 10,295,071 B2 * | 5/2019 | Nguyen .................. F16K 15/03 |
| 10,385,643 B2 | 8/2019 | Guidry |
| 10,385,644 B2 | 8/2019 | Guidry et al. |
| 10,385,645 B2 | 8/2019 | Guidry |
| 10,400,545 B2 | 9/2019 | Shirley et al. |
| 10,422,483 B2 | 9/2019 | Cook |
| 10,428,614 B2 | 10/2019 | Guidry et al. |
| 10,458,216 B2 | 10/2019 | Hefley |
| 10,480,300 B2 | 11/2019 | Guidry |
| 10,487,637 B2 | 11/2019 | Guidry et al. |
| 10,538,987 B2 | 1/2020 | Guidry et al. |
| 10,655,934 B2 | 5/2020 | Flaster et al. |
| 10,711,556 B1 | 7/2020 | Guidry et al. |
| 10,738,556 B2 | 8/2020 | Guidry et al. |
| 10,753,535 B2 | 8/2020 | McKim et al. |
| 10,876,371 B2 | 12/2020 | Guidry |
| 10,876,376 B2 | 12/2020 | Robinson et al. |
| 10,961,800 B2 | 3/2021 | Guidry |
| 10,961,801 B2 | 3/2021 | Christopherson et al. |
| 10,961,802 B2 | 3/2021 | Guidry |
| 10,982,522 B1 | 4/2021 | Hill et al. |
| 10,995,561 B1 | 5/2021 | Travix et al. |
| 11,015,413 B2 | 5/2021 | Guidry |
| 11,060,375 B2 | 7/2021 | Shirley et al. |
| 11,066,913 B2 | 7/2021 | Guidry et al. |
| 11,193,360 B1 | 12/2021 | Yeung et al. |
| 11,193,361 B1 | 12/2021 | Yeung et al. |
| 11,306,835 B1 * | 4/2022 | Dille ................... E21B 43/2607 |
| 11,319,757 B2 | 5/2022 | Robinson et al. |
| 11,391,109 B2 | 7/2022 | Guidry |
| 11,434,739 B2 | 9/2022 | Guidry |
| 11,513,500 B2 | 11/2022 | Jaaskelainen et al. |
| 11,608,905 B2 | 3/2023 | O'Brien et al. |
| 11,725,460 B2 | 8/2023 | Robinson et al. |
| 11,732,542 B2 | 8/2023 | Hughes |
| 11,753,890 B2 | 9/2023 | Chapman et al. |
| 11,753,911 B1 | 9/2023 | Kabrich et al. |
| 11,828,148 B2 | 11/2023 | Guidry |
| 11,834,941 B2 | 12/2023 | Guidry |
| 11,859,480 B2 | 1/2024 | Kabrich et al. |
| 11,867,043 B1 | 1/2024 | Adams et al. |
| 11,885,207 B2 | 1/2024 | Garro et al. |
| 11,898,411 B2 | 2/2024 | Guidry |
| 11,920,450 B2 * | 3/2024 | Yeung .................... E21B 43/26 |
| 11,970,920 B2 | 4/2024 | Guidry et al. |
| 11,976,534 B2 | 5/2024 | Guidry et al. |
| 12,000,254 B1 * | 6/2024 | Colley, III .......... F04B 53/1037 |
| 12,044,092 B2 | 7/2024 | Guidry et al. |
| 12,044,113 B2 | 7/2024 | Cornelssen et al. |
| 12,060,783 B2 | 8/2024 | Krupa et al. |
| 12,091,955 B2 | 9/2024 | Cornelssen et al. |
| 12,098,783 B2 | 9/2024 | Chen et al. |
| 12,111,331 B1 | 10/2024 | Stroebel et al. |
| 12,134,948 B2 | 11/2024 | Guidry et al. |
| 12,146,399 B2 | 11/2024 | Cornelssen et al. |
| 12,228,024 B2 | 2/2025 | Cornelssen et al. |
| 2004/0154790 A1 | 8/2004 | Cornelssen |
| 2007/0114039 A1 | 5/2007 | Hobdy et al. |
| 2012/0085532 A1 | 4/2012 | McGuire |
| 2014/0060806 A1 | 3/2014 | Nguyen et al. |
| 2014/0246192 A1 | 9/2014 | Guidry |
| 2015/0136383 A1 | 5/2015 | Guidry et al. |
| 2016/0348468 A1 | 12/2016 | Blacklock |
| 2017/0138144 A1 | 5/2017 | Christopherson et al. |
| 2017/0198548 A1 | 7/2017 | Dickinson |
| 2018/0073346 A1 | 3/2018 | Urdaneta |
| 2018/0119853 A1 | 5/2018 | Guidry et al. |
| 2018/0283102 A1 | 10/2018 | Cook |
| 2019/0024829 A1 | 1/2019 | Potier |
| 2020/0088021 A1 | 3/2020 | Guidry |
| 2020/0103078 A1 | 4/2020 | Scott et al. |
| 2020/0109804 A1 | 4/2020 | Nguyen |
| 2020/0362666 A1 | 11/2020 | Tran |
| 2021/0071503 A1 | 3/2021 | Ogg et al. |
| 2021/0108758 A1 | 4/2021 | Loven |
| 2021/0164313 A1 | 6/2021 | Guidry et al. |
| 2021/0317722 A1 | 10/2021 | Affleck et al. |
| 2021/0388931 A1 | 12/2021 | George et al. |
| 2022/0049802 A1 | 2/2022 | Choate et al. |
| 2022/0112796 A1 | 4/2022 | Jaaskelainen et al. |
| 2022/0186568 A1 | 6/2022 | Westgarth |
| 2022/0222395 A1 | 7/2022 | Song et al. |
| 2023/0041790 A1 | 2/2023 | Elliott et al. |
| 2023/0100479 A1 | 3/2023 | Roesner et al. |
| 2023/0119473 A1 | 4/2023 | Roesner et al. |
| 2023/0167709 A1 | 6/2023 | Beason et al. |
| 2023/0175341 A1 | 6/2023 | Guidry |
| 2023/0341061 A1 * | 10/2023 | Bull .................... E21B 43/2607 |
| 2024/0044548 A1 | 2/2024 | O'Neil et al. |
| 2024/0117725 A1 | 4/2024 | Adams et al. |
| 2024/0209720 A1 | 6/2024 | Cornelssen |
| 2024/0209721 A1 | 6/2024 | Cornelssen |
| 2024/0337178 A1 | 10/2024 | Cornelssen et al. |
| 2024/0344439 A1 | 10/2024 | Cornelssen et al. |
| 2024/0384637 A1 | 11/2024 | Bolen et al. |
| 2025/0034976 A1 | 1/2025 | Cornelssen et al. |
| 2025/0146396 A1 | 5/2025 | Cornelssen et al. |

FOREIGN PATENT DOCUMENTS

| | | |
|---|---|---|
| CN | 218971169 | 5/2023 |
| CN | 221400454 | 7/2024 |
| EP | 1010932 | 6/2000 |
| FR | 3016200 | 5/2016 |

OTHER PUBLICATIONS

USPTO Invitation to Pay Additional Fees for PCT/US2023/084998, Mar. 6, 2024.
International Search Report and Written Opinion for international application No. PCT/US2023/084998, mailed on May 22, 2024.
International Search Report and Written Opinion for international application No. PCT/US2023/084996, mailed on May 22, 2024.
Choke Relief Valves, CorTec, retrieved at https://uscortec.com/products/choke-relief-valves/.
International Search Report and Written Opinion for international application No. PCT/US2025/043657, mailed on Oct. 20, 2025.

* cited by examiner

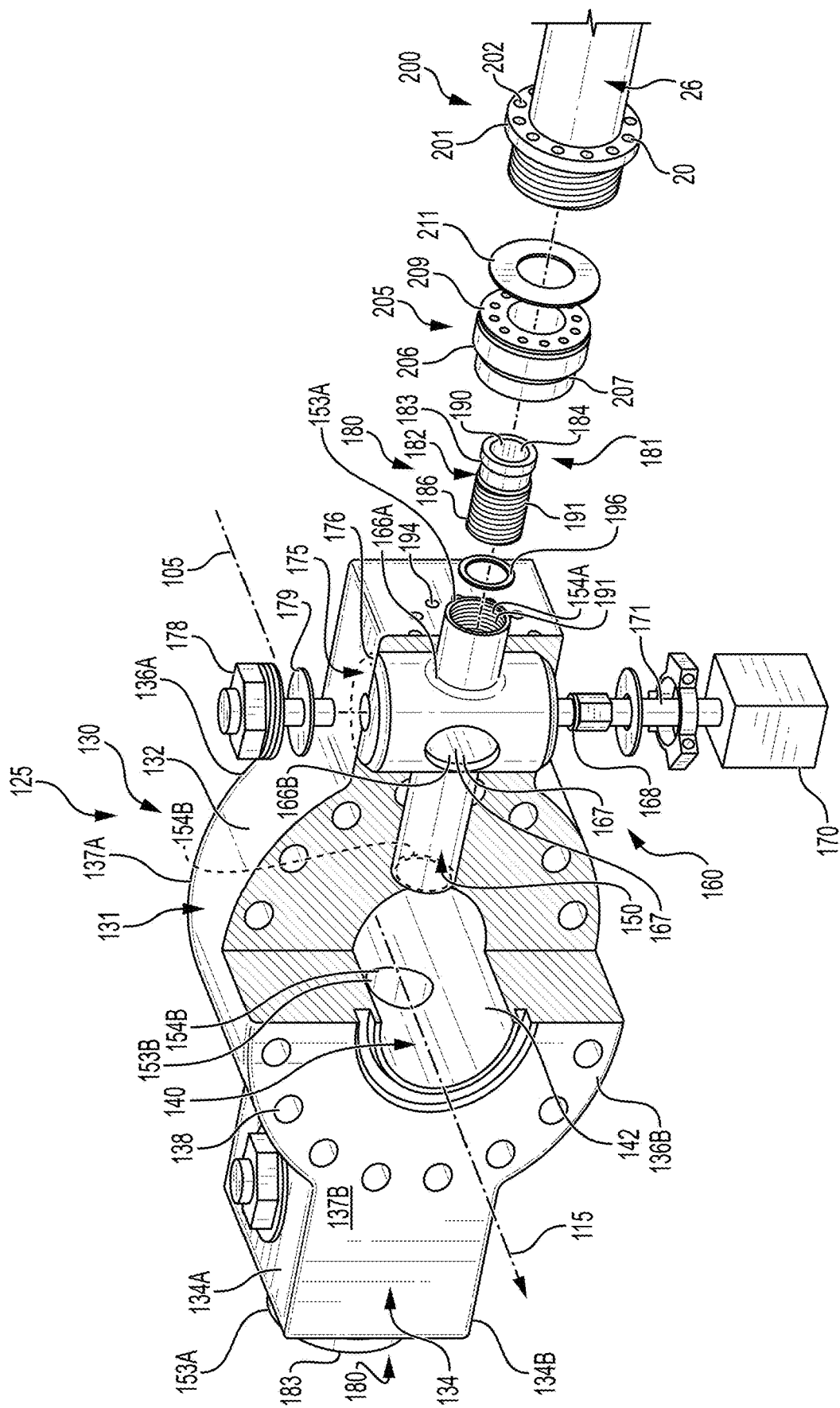

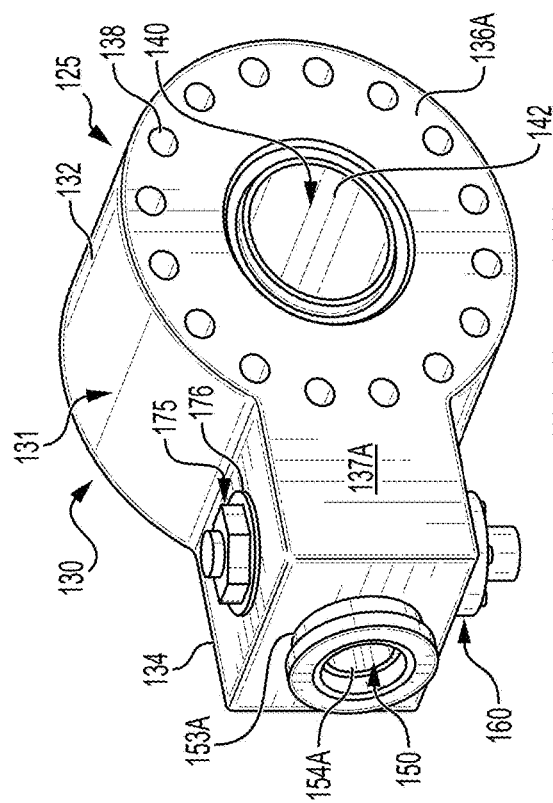
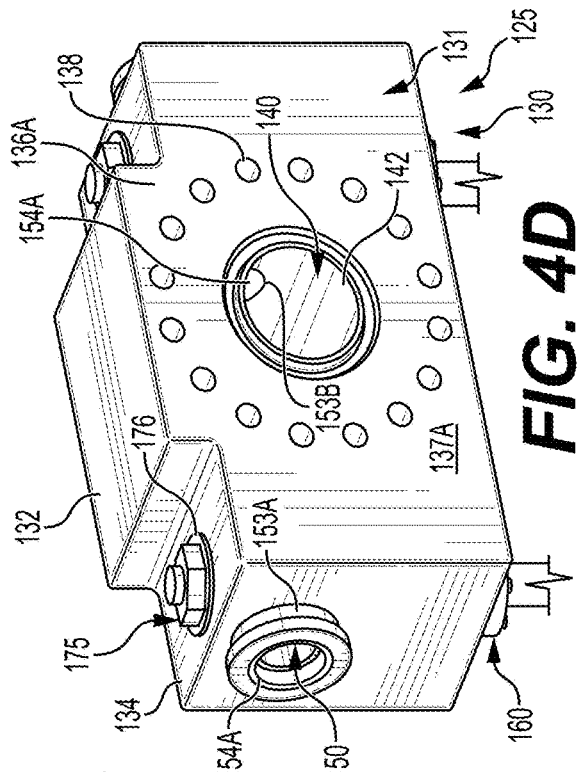
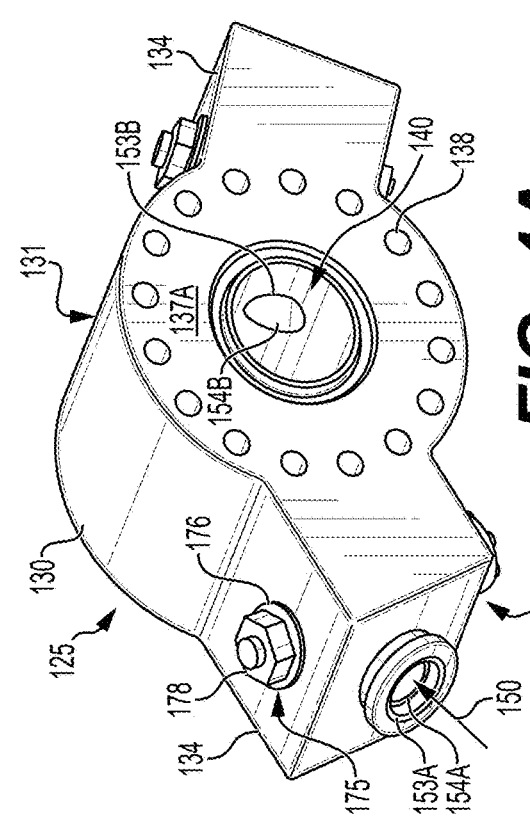
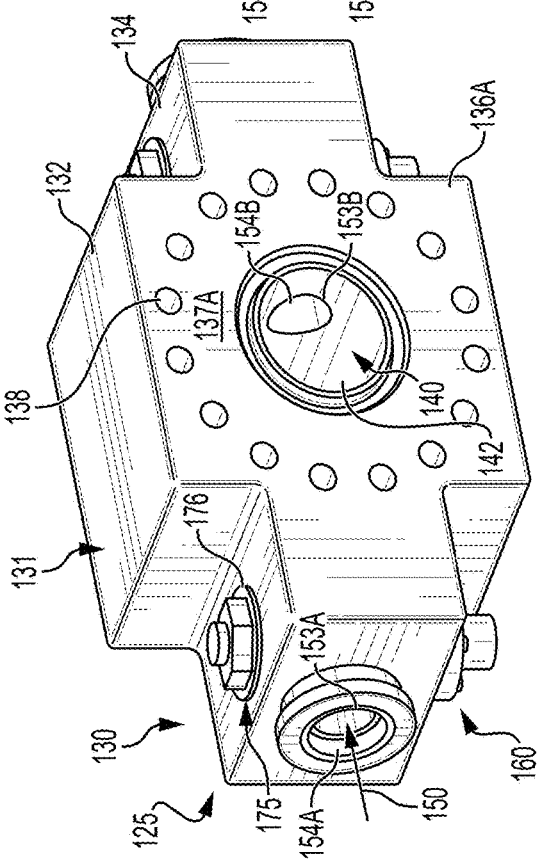

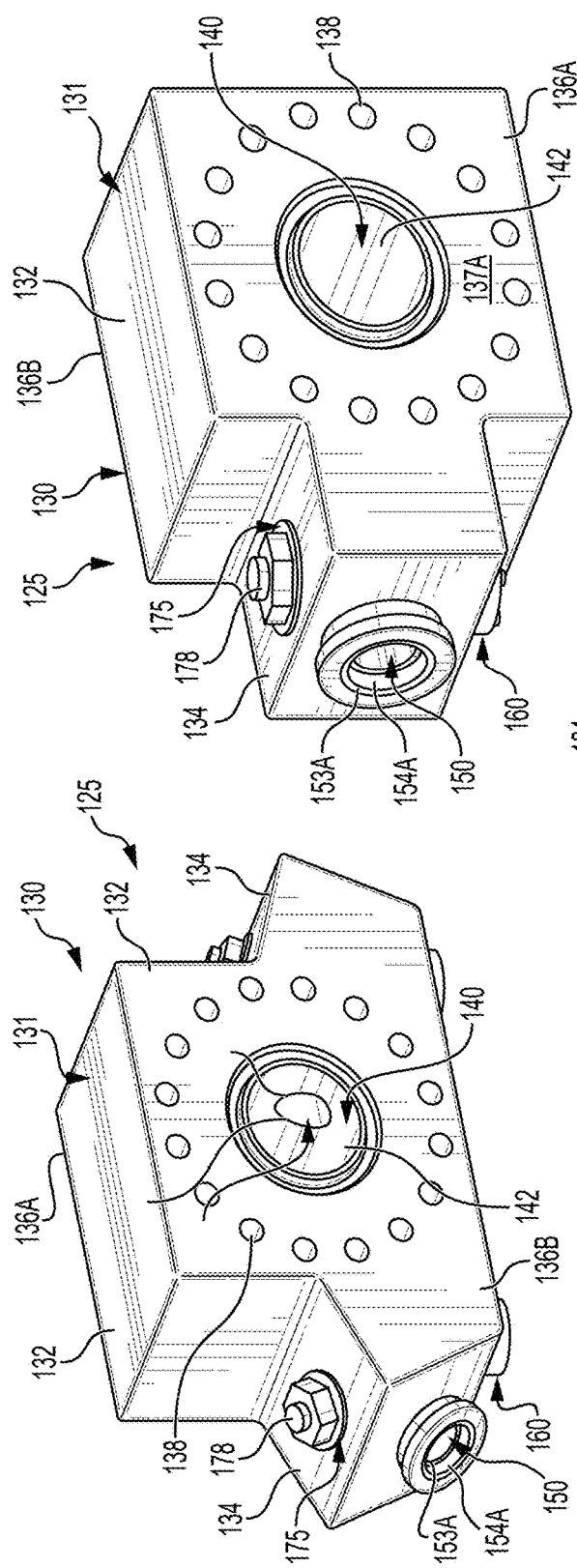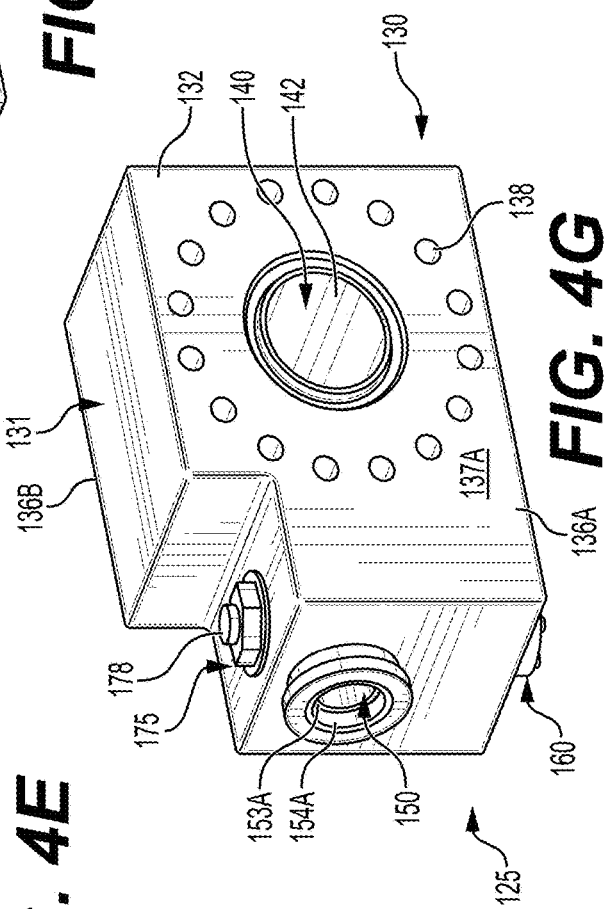

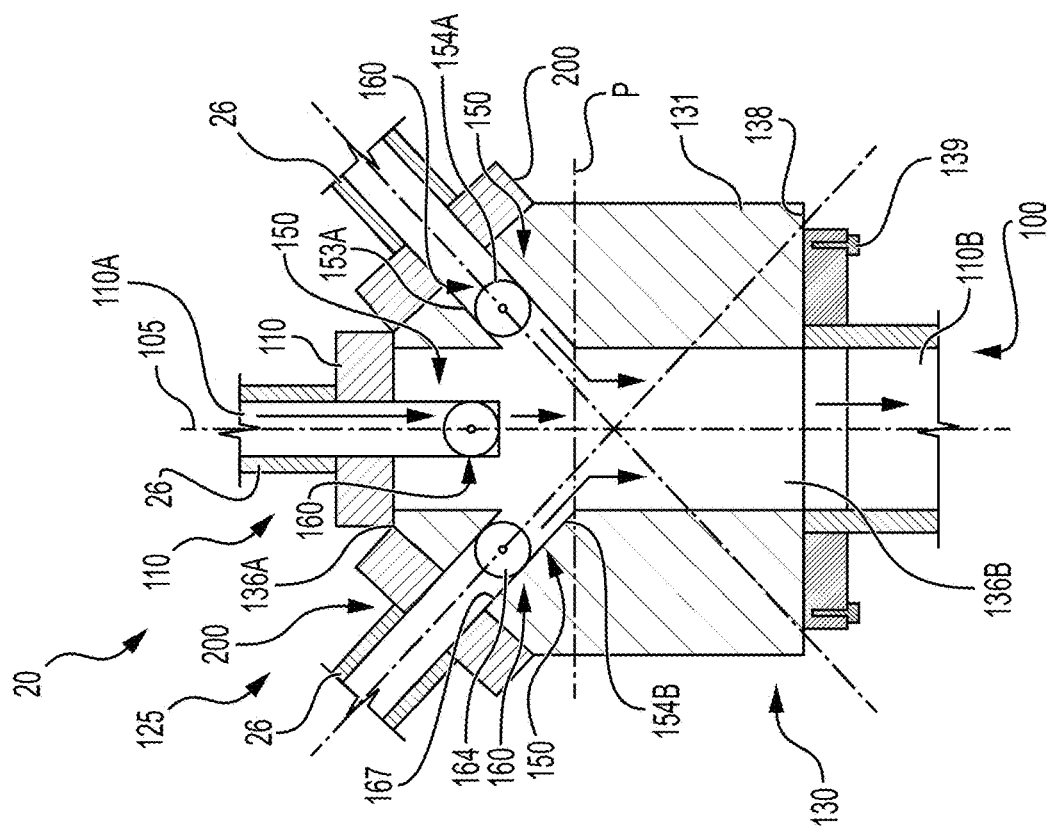

INTEGRATED JUNCTION AND CHECK VALVE ASSEMBLIES FOR HYDRAULIC FRACTURING SYSTEM MANIFOLDS AND RELATED METHODS

CROSS REFERENCE TO RELATED APPLICATIONS

This application claims priority to and the benefit of U.S. Provisional Application No. 63/778,733, filed Mar. 27, 2025, titled "INTEGRATED JUNCTION AND CHECK VALVE ASSEMBLIES FOR HYDRAULIC FRACTURING SYSTEM MANIFOLDS AND RELATED METHODS," and U.S. Provisional Application No. 63/771,784, filed Mar. 14, 2025, titled "INTEGRATED JUNCTION AND CHECK VALVE ASSEMBLIES FOR HYDRAULIC FRACTURING SYSTEM MANIFOLDS AND RELATED METHODS," the disclosures of which are incorporated herein by reference in their entireties. This application is also a continuation-in-part of U.S. Non-Provisional application Ser. No. 29/990,251, filed Feb. 20, 2025, titled "CROSS FLOW MANIFOLD JUNCTION," and U.S. Non-Provisional application Ser. No. 29/990,254, filed Feb. 20, 2025, titled "CROSS FLOW MANIFOLD JUNCTION," the disclosures of which are incorporated herein by reference in their entireties.

BACKGROUND

During a hydraulic fracturing operation, a pressurized fracturing fluid is injected into a subterranean formation via a wellbore or multiple wellbores. The fracturing fluid is injected into the subterranean formation at a higher pressure than the fracture pressure of the subterranean formation such that the fluid creates fractures therein. The fractures increase a permeability of the subterranean formation so that fluids such as oil, gas, water, or other associated fluids may more easily escape the subterranean formation and flow to the surface via the wellbore(s). Proppants (such as sand or other solids) also may be mixed with the fracturing fluid prior to injecting the fracturing fluid into the wellbore(s) and will flow into the fractures to hold the fractures open. Systems for supplying such pressurized fracturing fluids during hydraulic fracturing operations generally include pumps that pump the fracturing fluid from storage tanks under pressure through a fluid conduit of a manifold, such as a monobore or missile, to one or more frac trees connected to the wellbore(s) for injection into the subterranean formation(s). Typically, check valves will be connected to the manifold and to conduits such as hoses or other flexible flowlines connected to the valves by fluid connectors. The check valves control the flow of the fracturing fluid from the manifold and into zipper modules or fracturing trees at the wellbore site(s).

SUMMARY

Applicant, however, has recognized that during fracturing operations, the effects of axial loading, radial loading, vibration, bending moment, and fatigue experienced by these fluid connections can lead to premature failure of such connections, which effects can be substantially increased by the distance between the check valves from a centerline of the manifold. In addition, Applicant has recognized that the hoses or other flow lines connected to the check valves for directing the fracturing fluid away from the manifold are very heavy, creating additional load applied to other connection such that the hoses often must be separately supported to reduce the effects of the weight thereof. All of these effects can contribute to premature failure of the connections between the check valves and the manifold connections, causing considerable down time and increased costs of maintaining and conducting the overall fracturing operation.

Accordingly, Applicant has recognized that a need exists for hydraulic fracturing systems including manifold assemblies having improved junctions and valve connections, and methods of assembly and use thereof, that are directed to the foregoing and other related and unrelated problems in the art.

Briefly described, the present disclosure is directed to aspects and embodiments of hydraulic fracturing systems and methods of installation and operation thereof. In embodiments, the hydraulic fracturing systems can include one or more manifolds assemblies that, in embodiments, may include one or more manifolds (e.g., inlet and outlet manifolds); with a series of integrated flow junction and check valve assemblies positioned therealong. The integrated flow junction and check valve assemblies each can include a junction having one or more inlet bores (defining single or cross flow junctions) and fluid connectors configured to connect to different types of fluid connections of various different sizes and/or configurations of hoses, piping, flow lines, and other types of fluid conduits. In addition, in embodiments, the integrated flow junction and check valve assemblies also can be used with other components of the hydraulic fracturing system, such as a zipper module, a fracturing tree ("frac tree"), or other components.

According to some embodiments, a hydraulic fracturing system is provided including a manifold assembly having one or more manifolds that can define a fluid conduit having a fluid passage extending along a longitudinal axis and along which a pressurized fracturing fluid flows and is received, and one or more integrated flow junction and check valve assemblies located at spaced positions along the one or more manifolds. In embodiments, each integrated flow junction and check valve assembly can have one or more inlet bores that intersects with the fluid flow passage defined though the one or more manifolds and through which the pressurized fracturing fluid pumped by one or more pumping systems of the hydraulic fracturing system is received. The pressurized fracturing fluid will be directed through the one or more inlet bores of the integrated flow junction and check valve assembly into the one or more manifolds for supplying the pressurized fracturing fluid to one or more wellbores.

In embodiments, each integrated flow junction and check valve assembly can include a junction having a throughbore aligned with the longitudinal axis of the one or more manifolds and aligned with the fluid flow passage of the one or more manifolds, and one or more inlet bores each extending radially with respect to the longitudinal axis of the one or more manifolds from a first end having a fluid inlet opening and in which a fluid connector is received to a second end having a fluid outlet opening in communication with the fluid flow passage of the manifold. The fluid connector can be connected to a mating fluid connector of a fluid conduit, such as a pipe, hose, or flow line, through which the pressurized fluid is supplied to the manifold.

In some embodiments, the junction of each of the integrated flow junction and check valve assemblies can include a body having a central portion adapted to couple to the manifold (e.g., being positioned between and connector to a pair of manifold sections) and through which the throughbore extends. The body of each junction further can include one or more side portions extending radially therefrom. In embodiments, the one or more inlet bores will extend through the one or more side portions and define an inlet flow path from a chamber within the central portion to the outlet opening.

In embodiments, the integrated flow junction and check valve assemblies further will include a valve internally located within the body of the junction along the one or more inlet bores so as to be integrated within the junction. Also in embodiments, the valve can include a check valve that can be controlled by an actuator such as an electrical or hydraulic motor, operable to selectively open and close the valve for controlling the flow of pressurized fracturing fluid along the one or more inlet bores to the fluid flow passage of the manifold. Other types of valves also could be used. In embodiments, the internal, integrated mounting of the check valve within the body of the junction provides an integrated junction and check valve assembly that can be installed along a manifold of a hydraulic fracturing system as a generally unitary structure or component, which, in some instances, can be installed along the manifold with the need for externally mounted check valves and/or separate valve tees connected to the manifold being substantially reduced or eliminated.

In some embodiments, the integrated flow junction and check valve assemblies further can include a stream-lined shape or design (e.g., including substantially round, square, rectangular, or various other polygonal configurations) adapted to enable a reduction in size and weight thereof. Such reductions in the size and weight, together with the integration of the check valve within the body of the junction thereof, further can facilitate the handling and installation of the integrated flow junction and check valve assemblies along a manifold, potentially saving labor and time of installation and servicing of the manifold assembly overall.

In addition, in embodiments, the integrated flow junction and check valve assembly can have various configurations having multiple fluid inlets located at a distal end of a plurality of side portions thereof. For example, in some embodiments, an integrated flow junction and check valve assembly can include a cross flow junction having a pair of side portions extending radially on opposite sides of the central portion, while in other embodiments, an integrated flow junction and check valve assembly can include different arrangements of side portions (e.g., being configured as 3-way, 4-way or 5-way junctions).

Further, in embodiments, one or more inlet bores (and/or side portions) of the integrated flow junction and check valve assemblies can be located so as to extend substantially along a horizontal plane perpendicular to the longitudinal axis of the manifold, while in other embodiments, can be oriented at an angle (e.g., a downwardly extending angle) with respect to the longitudinal axis of the manifold). In still other embodiments, one or more of the inlet bores of the integrated flow junction and check valve assemblies can be located at different elevations with respect to the longitudinal axis of the manifold (e.g., being positioned above or below the horizontal plane that extends perpendicular to the longitudinal axis of the manifold). Other configurations or arrangements of the inlet bores also can be provided.

In embodiments, a cross bore can extend at least partially through the side portion(s) of the junction transversely with respect to the one or more inlet bores. In embodiments, the check valve integrated within the body of the junction, will be located at an intersection between the cross bore and the one or more inlet bores. The cross bore generally will be sized to receive the check valve therethrough, and, in embodiments, can have a removeable cap or cover that is received in and seals an access opening of the cross bore. In embodiments, the cap can be removable to enable access to and removal of the check valve or its components via the cross bore, to facilitate replacement and servicing of the check valve. A second or lower end of the cross bore also can be provided with an opening configured to receive a valve stem or rod of the valve therethrough for connector to an actuator such as a hydraulic or electric motor.

In embodiments, each check valve can engage with or include a fluid connector for connection to a corresponding fluid conduit coupler of a hose or flow line. In embodiments, the fluid connector can include a body at least partially received within the inlet bore and which can be configured to engage a connection, such as a threaded connector, along the inner surface of the inlet bore. In some embodiments, the fluid connector can include a connector adapter that can be releasably engaged therewith or can be configured as a replaceable fluid connector configured to be easily removable and interchangeable so as to enable connection of the check valve to different types of fluid connectors. For example, the fluid connector can be configured, and/or can include a connector adapter configured to connect to flanged, hub, studded, threaded or other fluid conduit couplers (e.g., 3" API connectors, 1502 connectors, Hub-D connectors, or other, similar fluid conduit couplers).

Some aspects disclosed herein are directed to a method of assembling a manifold of a hydraulic fracturing system. In embodiments, the method can include inserting a fluid connector within an inlet bore of a junction of a manifold of a hydraulic fracturing system. In addition, in embodiments, the method can include moving the fluid connector into fluid communication with the check valve integrated within the junction and securing the fluid connector within the inlet bore; and connecting the fluid connector to a fluid conduit coupler at a hose or other fluid conduit. Further, the method can include engaging a retainer with the fluid connector and the fluid conduit coupler to secure the two together.

According to aspects of the present disclosure a method of assembling a manifold of a hydraulic fracturing system, can include (a) positioning one or more junction between a pair of spaced manifold sections; wherein the junction includes a body having a throughbore extending longitudinally through a central portion of the body, one or more inlet bores extending radially from the throughbore; and wherein one or more check valves is positioned along the inlet bore so as to be integrated within the body of the junction; (b) securing the junction to each of the spaced manifold sections with the throughbore of the junction aligned with a central flow path extending through the manifold; (c) securing a fluid connector within the one or more inlet bores of the junction; and (d) securing a fluid connector of a fluid conduit to the fluid connector.

In embodiments of the method, securing the fluid connector within the one or more inlet bores includes inserting a first portion of the fluid connector into the one or more inlet bores and engaging a threaded connection of the first portion with a corresponding threaded connection along the one or more inlet bores, and securing the fluid conduit coupler of the fluid conduit to the fluid connector includes attaching a second portion of the fluid connector positioned outside of the one or more inlet bores with a first end of the fluid conduit coupler by fasteners, thread connection, clamping, or combinations thereof.

According to another aspect, a manifold assembly for a hydraulic fracturing system can include a plurality of manifold sections, one or more junction including; a throughbore aligned with a central flow path extending through the manifold sections, one or more inlet bores extending in a cross-wise direction, and one or more check valves integrally positioned within the junction along the one or more inlet bores.

In embodiments, the manifold can further include a fluid connector including a body including a first portion received within the one or more inlet bores and a second portion having an external shoulder adapted to engage against an outer surface of the junction. The fluid connector is configured to connect to a fluid conduit coupler of a fluid conduit of the hydraulic fracturing system for supplying a pressurized fluid to the one or more inlet bores.

In embodiments of the manifold, the second portion of the fluid connector is configured to releasably engage the first portion of the fluid connector. The second portion is removable and replaceable so as to enable connection of the first portion to one or more of a fluid conduit coupler such as a 3" API connector, a 1502 connector, a Hub-D connector, or a combination thereof.

In some embodiments of the manifold, the first portion of the fluid connector is threadedly engaged within the one or more inlet bores.

In embodiments of the manifold, the plurality of manifold sections includes a first elongate manifold section and a second elongate manifold section. The junction is positioned between the first elongate manifold section and the second elongate manifold section along a longitudinal axis. The junction includes a body including a central portion having an upstream end connected to the first elongate manifold section via a first connection, a downstream end spaced from the upstream end along a longitudinal axis and connected to the second elongate manifold section via a second connection, and one or more side portions along which one or more inlet bores extends. In some embodiments of the manifold, the first connection and the second connection each include flanged connections.

In some embodiments of the manifold, the junction includes a plurality of side portions each including an inlet bore extending between an inlet in communication with the throughbore, and an outlet located at a terminal end of each side portion.

According to another aspect, a manifold for a hydraulic fracturing system includes a plurality of manifold sections, and one or more junction positioned between adjacent manifold sections. The one or more junction include a body having an upstream end configured to connect with a first manifold section, a downstream end spaced from the upstream end and configured to connect to a second elongate manifold section, and a throughbore extending longitudinally between the upstream end and the downstream end, so that wherein when the junction is installed between the first and second manifold sections, the throughbore is axially aligned with a fluid flow passage of the manifold. One or more inlet bores extend axially through the body from a first end having an inlet opening located along a distal end of a side portion of the body to a second end having an outlet opening in communication with the throughbore, so that when a pressurized fluid is received through the inlet opening and is directed along the one or more inlet bores to the outlet opening for introducing the pressurized fluid into the fluid flow passage of the manifold. One or more check valves are internally mounted within the side portion of the body along the one or more inlet bores so as to be integrated within the body of the junction and configured to restrict a flow of the pressurized fluid along the one or more inlet bores.

In embodiments, the junction further includes a fluid connector including a first portion configured to be received within the one or more inlet bores upstream from the one or more check valves, and a second portion located outside of the one or more inlet bores and configured to connect to a fluid conduit coupler of a fluid conduit.

In embodiments, the second end of the fluid connector can include a connector adapter configured to releasably engage the first portion of the fluid connector, and the second portion is removable and replaceable so as to enable connection of the first portion to the fluid conduit coupler such as one or more of a 3" API connector, a 1502 connector, a Hub-D connector, or a combination thereof.

In some embodiments, the first end of the fluid connector includes a threaded connector configured to engage a corresponding threaded connector within the one or more inlet bores.

In some embodiments, the second end of the fluid connector includes a hub connector, a studded connector, a threaded connector, a flanged connector.

According to still another aspect, a junction for a hydraulic fracturing system manifold is provided. An embodiment of the system includes a body which includes a central portion having a longitudinally extending throughbore that is in communication with a fluid flow passage extending though the manifold and along which a fluid is transported, and one or more side portions extending radially from the central portion. The one or more side portions have one or more inlet bores extending therethrough, and the one or more inlet bores is configured to define a flow path extending between an inlet in communication with the throughbore and an outlet at a terminal end of the one or more side portions and along which at least a portion of the fluid is directed away from the manifold. One or more check valves is positioned along the one or more inlet bores, and the one or more check valves is configured to substantially restrict a backflow of the fluid passing through the one or more inlet bores. The one or more check valves is integrated within the body.

In some embodiments of the junction, the one or more side portions includes a plurality of side portions extending radially from the central portion, each of the side portions including at inlet bore extending therethrough, and one or more valves internally located along the inlet bore of each side portion so as to be integrated within the side portion.

In some embodiments of the junction, the inlet bores of at least some of the plurality of side portions can have a first bore diameter, and at least some of the inlet bores have a second bore diameter that is different from the first bore diameter.

In embodiments of the junction, the central portion of the body is configured to couple to one or more manifolds section of the manifold, with the throughbore of the central portion aligned with the fluid flow passage of the manifold.

In some embodiments of the junction, the one or more side portions includes two or more side portions extending away from the central portion.

In some embodiments of the junction, each of the side portions extend radially from the central portion at a downward angle with respect to a horizontal axis extending through the central portion.

In other embodiments of the junction, the one or more inlet bores extends downwardly at an angle with respect to a horizontal plane extending through the central portion.

In embodiments, the junction includes a cross flow junction having at least two side positions, each side portion including an inlet bore extending therethrough; and wherein one or more of the side portions extends radially from the central portion at an angle with respect to a horizontal plane extending through the central portion.

In embodiments, the junction further includes one or more cross bores located along the one or more side portions of the body and including one or more access port; and wherein the one or more cross bores extends transversely through the one or more side portions and configured to enable access to the one or more check valves.

In embodiments, the junction further includes a fluid connector positioned at the terminal end of the one or more side portions. The fluid connector is configured to enable connection of the one or more check valves located within the one or more side portions to a fluid conduit coupler such as one or more of a 3" API connector, a 1502 connector, a Hub-D connector, or a combination thereof.

According to a further aspect, a hydraulic fracturing system includes a manifold assembly including one or more manifolds having a fluid flow passage defined therethrough and along which a pressurized fracturing fluid is transported, and one or more integrated junction and valve assembly positioned along the one or more manifolds. The one or more integrated junction and valve assembly includes a junction having a body including a throughbore aligned with and in fluid communication with the fluid flow passage of the one or more manifolds, and one or more inlet bores extending radially with respect to a longitudinal axis of the one or more manifolds through the body and away from the throughbore. The one or more inlet bores defines an inlet flow path extending from an inlet opening located along an outer surface of the body through the body and to an outlet opening located at the throughbore, so that a flow of the pressurized fracturing fluid is received through the inlet opening and is directed toward the outlet opening for introduction of the pressurized fracturing fluid into the one or more manifolds during operation, as will be understood by those skilled in the art. One or more valves is positioned along the one or more inlet bores and operable to regulate the flow of the pressurized fracturing fluid passing along the one or more inlet bores, and the one or more valves is integrated within the body of the junction. In some embodiments, the one or more valves is oriented at an angle with respect to the longitudinal axis of the one or more manifolds.

In some embodiments, the one or more integrated junction and valve assembly includes a cross flow junction having two or more side portions each extending in a crosswise direction with respect to the one or more manifolds, each of the two or more side portions including an inlet bore extending therethrough and along which one or more valves is located.

In embodiments, the one or more valves includes a check valve positioned along each inlet bore of each of the side portions, each check valve being integrated within one of the side portions.

In embodiments, the one or more integrated junction and valve assembly further includes a cross bore located along each side portion of the body of the junction, extending transversely through the side portion and intersecting with the one or more inlet bores at a location at which the one or more valves is located, the cross bore including an access opening configured to enable access to the one or more valves positioned along the inlet bore.

In embodiments, the one or more integrated junction and valve assembly further includes a fluid connector at least partially positioned within one or more inlet bores adjacent the one or more valves. The fluid connector is configured to enable connection of the one or more valves to a fluid conduit connector such as one or more of a 3" API connector, a 1502 connector, a Hub-D connector, or a combination thereof.

Other aspects disclosed herein are directed to a hydraulic fracturing system and to a manifold assembly including a manifold. In some embodiments, the manifold includes a series of elongated manifold sections forming a fluid conduit configured to receive a pressurized fracturing fluid. In embodiments, one or more integrated flow junction and check valve assemblies can be positioned between the manifold sections and aligned therewith along a longitudinally extending axis of the manifold.

In embodiments, the one or more integrated flow junction and check valve assemblies can each include a junction having a central portion with a first or upstream end connected to a first or upstream manifold section and a second or downstream end connected to a second manifold section and throughbore aligned with the fluid flow passage of the manifold. The junction further can include one or more inlet bores extending radially with respect to a longitudinal axis of the manifold. In embodiments, the one or more inlet bores can include a first end having an inlet opening and through which a pressurized fluid is received, and a second end that intersects with the throughbore and which includes an outlet opening in fluid communication with a chamber defined along the throughbore for introducing the pressurized fluid into the manifold.

In embodiments, each integrated flow junction and check valve assembly further will include a valve (e.g., a check valve) internally located along the one or more inlet bores so as to be integrated within the body of the junction. Still further, in embodiments, integrated flow junction and check valve assembly having a fluid connector will be received within the inlet bore and will be configured to connect the inlet bore to a corresponding fluid conduit coupler of a hose or flow line supplying the pressurized fluid thereto. By integrating the valve within the junction, connecting the fluid conduit coupler of the hose directly to the junction the connection between the fluid connector and fluid conduit coupler is substantially supported and stabilized by the junction to reduce wearing and fatigue of such a connection due to axial and radial loading and vibration created during a fracturing operation, as well as the effects of the weight of the hose of flow line on such a connection. In additional embodiments, the junction of each integrated flow junction and check valve assembly also can include a cross bore extending between the outer surface and the one or more inlet bores for enabling access to the check valves.

Still other aspects are directed to a junction for a manifold of a hydraulic fracturing system. In embodiments, the junction can include a body having a first or upstream end configured to connect with a first manifold section of the manifold, a second or downstream end spaced from the upstream end along a longitudinal axis and configured to connect to a second manifold section, and a chamber defined between the upstream and downstream ends. Further, the junction can include a throughbore extending through the chamber. In embodiments, the junction further includes one or more inlet bores extending radially outward from the throughbore, and along which one or more valves is located so as to be integrated within the junction. In embodiments, the one or more valves includes a check valve.

By incorporating or integrating the check valves into the junctions of the integrated flow junction and check valve assemblies, the effects of axial and radial loading, vibration and fatigue experienced by the fluid connections between the manifold and externally located valves, and between the valves and hoses or flow lines, as well as the effects of the substantial weight of the hoses or flow lines connected thereto can be significantly reduced. In addition, the internal/integrated mounting and the orientation of the valves along the inlet bores of the integrated flow junction and check valve assemblies can help reduce the ability of solids such as sand, dirt, and other materials carried by the pressurized fracturing fluid, from settling within the valves and hoses or flow lines. Thus, the configuration of the integrated flow junction and check valve assemblies according to the principles of the present disclosure are configured to reduce the number of potential failure points and potentially enable a substantial reduction in wear and other damage to the connections due to the passage of solid materials therethrough, potentially extending or enabling increased operational life of the valves, hoses or flow lines, and other components of the hydraulic fracturing system.

Various other aspects, features, and advantages of a hydraulic fracturing system and manifold assembly thereof, including an integrated flow junction and check valve assembly, and methods of use thereof according to exemplary embodiments thereof are discussed herein. The embodiments described herein include a combination of features and characteristics intended to address various shortcomings associated with certain prior devices, systems, and methods. Moreover, it is to be understood that both the foregoing information and the following detailed description provide merely illustrative examples of various aspects and embodiments and are intended to provide an overview or framework for understanding the nature and character of the claimed aspects and embodiments. It further should be appreciated that this disclosure may be readily utilized as a basis for modifying or designing other structures for carrying out the same purposes as the disclosed embodiments, and that such equivalent constructions do not depart from the spirit and scope of the principles disclosed herein. Accordingly, these and other aspects, along with advantages and features of the present disclosure, will become apparent through reference to the following description and the accompanying drawings.

BRIEF DESCRIPTION OF THE DRAWINGS

The accompanying drawings, which are included to provide a further understanding of the embodiments of the present disclosure, are incorporated in and constitute a part of this specification, illustrate embodiments of the present disclosure, and together with the detailed description, serve to explain principles of the embodiments discussed herein. No attempt is made to show structural details of this disclosure in more detail than may be necessary for a fundamental understanding of the embodiments discussed herein and the various ways in which they may be practiced. According to common practice, the various features of the drawings discussed below are not necessarily drawn to scale. Dimensions of various features and elements in the drawings may be expanded or reduced to illustrate embodiments of the disclosure more clearly. For a detailed description of various embodiments, reference will now be made to the accompanying drawings in which:

FIG. 3A is an exploded perspective view of an example embodiment of an integrated flow junction and check valve assembly, having portions thereof broken away for clarity, configured as a cross flow junction and including an embodiment of a connector assembly for connection of the integrated flow junction and check valve assembly to a fluid conduit in accordance with the principles of the present disclosure.

FIGS. 4A-4G are perspective views which illustrate additional embodiments of integrated flow junction and check valve assemblies for a manifold such as shown in FIGS. 2A-3B, according to the principles of the present disclosure.

FIG. 5A is a sectional plan view illustrating an additional embodiment of an integrated flow junction and check valve assembly, shown as including multiple flow bores with check valves integrated therealong and which intersect with the fluid flow passage of the manifold at an angle in accordance with the principles of the present disclosure.

FIG. 5B is a sectional plan view illustrating an additional embodiment of an integrated flow junction and check valve assembly, shown as including multiple flow bores with check valves integrated therealong in accordance with the principles of the present disclosure.

DETAILED DESCRIPTION

Figure 1:
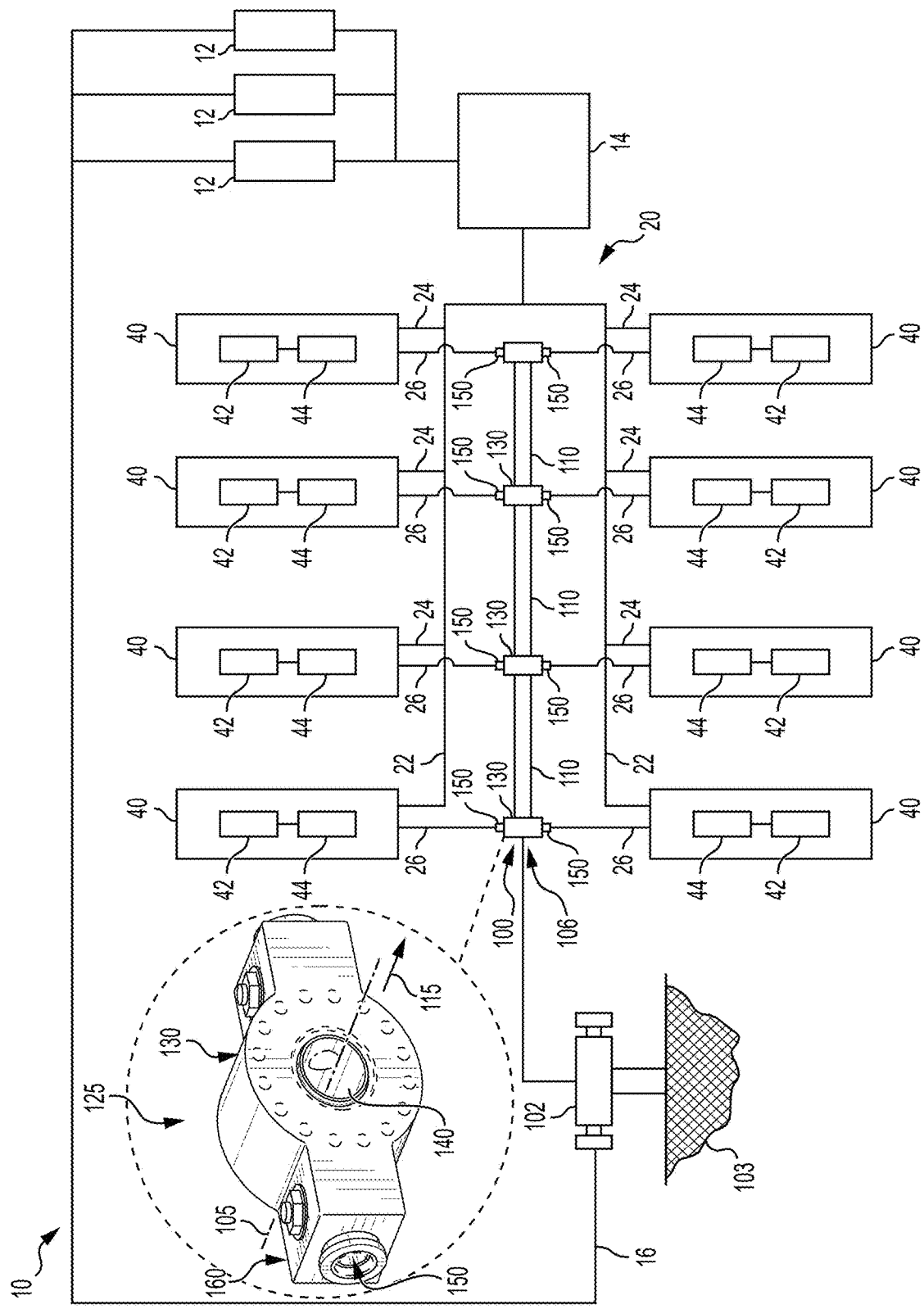
FIG. 1 is a schematic diagram of a hydraulic fracturing system including a manifold according to an embodiment of the present disclosure.

Embodiments of the present disclosure are directed to hydraulic fracturing systems, and various components and methods of installation and use thereof. In embodiments, the hydraulic fracturing systems include a manifold assembly having one or more manifolds (e.g., inlet and outlet manifolds) configured to receive and transport a pressurized fracturing fluid along a flow path for distribution of the pressurized fracturing fluid to one or more wellbores. In various embodiments, each manifold of the manifold assembly can include a series of integrated flow junction and check valve assemblies, each of which can include a junction having an integrated valve internally located within the junction along an inlet bore defined though the junction. In embodiments, the internally integrated valve will include a check valve operable to control or regulate the flow of the pressurized fluid through the junction (including substantially preventing a backflow of the pressurized fluid) and into the manifold for delivery to one or more wellbores.

As will be understood, the terms "pressurized fracturing fluid," "fracturing fluid," and "fluid" may be used interchangeably throughout the present disclosure to refer to a fluid injected into a wellbore during operation of embodiments of the hydraulic fracturing systems of the present disclosure.

As used herein, the terms "comprise," "comprises," "comprising," "include," "includes," "including," "has," "having," or any other variation thereof, and are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or.

Dimensional information in the following description should be understood as nominal dimensions that are intended to encompass variations in dimensions that normally occur in the pumping systems and components thereof such as described herein. Terms such as "approximately," "about," and "substantially" may be used to qualify dimensional information in the following description but such qualifications are intended merely to reinforce that the dimensions are nominal dimensions and not to differentiate qualified dimensions from unqualified dimensions.

Also, the terms "couple," "linked," and "connect" and any variations thereof will be understood to cover both indirect and direct connections between one or more parts or elements.

The terminology used herein is for the purpose of description only and is not intended to be limiting of the present disclosure. Spatially relative terms, such as "beneath," "below," "lower," "above," "upper," and the like may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (e.g., rotated 90 degrees or at other orientations) and the spatially relative descriptors used herein interpreted accordingly.

In addition, the terms "axial" and "axially" generally mean along or substantially parallel to a given axis (e.g., central axis of a body or a port), while the terms "radial" and "radially" generally mean substantially perpendicular to or extending at a tangent to a given axis.

As used herein, the singular forms "a," "an," and "the" are intended to include the plural forms as well, unless the context indicates otherwise. It will be further understood that the terms "comprises" and/or "comprising" specify the presence of stated features, steps, operations, elements, and/or components, but do not preclude the presence or addition of one or more other features, steps, operations, elements, components, and/or groups thereof.

During a hydraulic fracturing operation, various fluid conveyance devices of a hydraulic fracturing system (such as shown at 10 in FIG. 1) may be used to route flows of a relatively high-pressure fracturing fluid from one or more pumping units to one or more wellbores. For instance, in embodiments, the hydraulic fracturing assembly 10 can include a manifold assembly 20, which can include one or more manifolds that each define or include a fluid conduit configured to receive the pressurized fracturing fluid from one or more pumps. Such manifolds are sometimes referred to as "missiles," and in embodiments, can include monobore type manifolds with a single fluid conduit, while in other embodiments, can have other configurations including more than one fluid conduit. In embodiments, each manifold of the manifold assembly also may include one or more junctions through which a pressurized fracturing fluid is received into the manifold. The junctions typically will have a fluid connector at the inlet end thereof bore that can connect to a check valve or to a hose, flow line or other fluid conduit (e.g., sometimes referred to as a "frac hose") or to a valve tee including one or more check valves that regulate a flow of the pressurized fracturing fluid to a zipper module or fracturing tree ("frac tree") for injection of the pressurized fracturing fluid into a wellbore such as shown at 102.

Such fluid connectors represent a weak point of the hydraulic fracturing systems, that often can experience failure due to the effects of the high pressures of the fracturing fluid (which includes subjecting the fluid connections to erosive contact with proppants entrained within the high-pressure fracturing fluid), axial and radial loading, fatigue, and vibrations within the system (such as vibrations caused by operation of the pump(s)). Such effects further can be multiplied by the distance of the check valve from the manifold, which also increases the bending moment exerted on such connections. Moreover, the hoses connected to the check valves generally are very heavy and typically exit the fluid connections horizontally with respect to the ground, which is conducive to "sanding off" of the hoses wherein the proppant materials such as sand and other solids are able to settle in the hoses. The hoses typically must be supported along the length thereof to reduce the effects of the weight of the hoses on the fluid connectors. Such issues can lead to premature failures of the fluid connectors, leading to significant downtime and costs as the removal and replacement of these fluid connectors can be cumbersome and time consuming. Thus, a failure of a fluid connector on the high-pressure manifold can lead to significant delays in a hydraulic fracturing operation and an associated increase in the costs and time associated with the hydraulic fracturing operation.

In addition, conventional junctions generally may be relatively large and bulky to accommodate conventional flanged connections of the fluid connectors and to provide sufficient wall thicknesses for the internal flow bores to contain the high-pressure fracturing fluid during operations. The sizes and weight of such junctions, and in particular larger cross flow junctions, can substantially increase the footprint and the total weight of the high-pressure manifold along which they are installed thereby further increasing the costs of these components and the complexity (and inherent dangers) for moving these components about the wellsite.

Accordingly, embodiments of integrated flow junction and check valve assemblies for a manifold of a hydraulic fracturing system are disclosed herein. In embodiments, the junction can include various configurations, for example, including a single side portion with one or more inlet bores defined therethrough, while in other embodiments, can be constructed with multiple inlet bores (e.g., a cross flow junction, 3-way, 4-way, 5-way, or more junctions) and will include an internally/integrally mounted valve, such as a check valve, therein. In addition, in embodiments, the integrated flow junction and check valve assemblies can have a streamlined shape and design so as to allow for a significant reduction in size and weight and the manifold overall.

Still further, in some embodiments of the integrated flow junction and check valve assemblies disclosed herein include fluid connectors that are configured to facilitate quick replacement in the event of a failure so as to minimize stoppage time. In some embodiments, the fluid connectors can further comprise or include a removable/interchangeable connector adapter that can be inserted within an inlet bore of an integrated flow junction and check valve assembly enable connector to different fluid connectors so as to without the large, flanged connections generally associated with a conventional fluid connector.

As will be described in more detail below, the fluid connector may be the component of the fluid connector having the highest likelihood of failure. Thus, by configuring the fluid connector (with or without a separate connector adapter) so that it is received within and supported by the body of the junction and also may be easily removed and replaced, the downtime associated with the replacement of a failed fluid connector on the manifold may be reduced. As a result, through use of the embodiments disclosed herein, a hydraulic fracturing operation may be conducted more safely and efficiently.

FIG. 1 shows a schematic diagram of a hydraulic fracturing system 10 including a manifold 100 having one or more integrated flow junction and check valve assemblies 125 according to some embodiments. During operations, system 10 may inject a high-pressure fracturing fluid into a wellhead 102 (e.g., to a frac tree) that is connected to a wellbore extending into a subterranean formation 103 to fracture the subterranean formation 103 (FIG. 1) as previously described. In some embodiments, the system may inject the high-pressure fracturing fluid into the subterranean formation 103 via a plurality of wellbores.

It should be appreciated that the hydraulic fracturing system 10 shown in FIG. 1 schematically depicts some components and assemblies that may be used during a hydraulic fracturing operation, and that in some embodiments additional or fewer components may be used within the system 10. Thus, the particular combination and/or arrangement of components of the system 10 depicted in FIG. 1 is not limiting to other potential embodiments of system 10.

In embodiments, the hydraulic fracturing system 10 generally can include a plurality of storage vessels 12 that are each configured to hold a volume of fracturing fluid therein. The fracturing fluid stored in the storage vessels 12 may include any liquid or semi-liquid (such as a gel) that is suitable for injection into and fracturing of the subterranean formation 103 as previously described. In some embodiments, the fracturing fluid includes an aqueous solution including substantially pure water or water mixed with one or more additives (such as gels or gelling agents, chemicals, or other additives as will be understood by those skilled in the art). The storage vessels 12 may include any suitable container for holding a volume of fluids (such as liquids) therein. For instance, in some embodiments, storage vessels may include rigid tanks, flexible tanks (such as bladders), open pits, mobile tanks (that may be pulled by a tractor trailer or other vehicle), or a combination thereof.

A blender 14 is positioned downstream of the storage vessels 12 that is configured to mix a proppant into the fracturing fluid. The proppant may include sand or other suitable solids. As previously described, the proppant is configured to flow into the fractures within the subterranean formation 103 so as to hold the fractures open after the hydraulic fracturing operation has ended. In some embodiments, additives (such as chemical additives) may be mixed into the fracturing fluid within the blender 14 either in addition or alternatively to the proppant. The blender 14 emits the fracturing fluid, now with proppant mixed therein, to a manifold assembly 20 that communicates the fracturing fluid to and from a plurality of pumping units 40.

In some embodiments, the manifold assembly 20 includes one or more manifolds (e.g., low-pressure, inlet manifolds 22 and high-pressure, outlet manifolds 100). In embodiments, the manifold assembly 20 can include one or more inlet manifolds 22 and one or more outlet manifolds 100. However, in other embodiments, different numbers, arrangements, and combinations of inlet manifolds and outlet manifolds may be utilized, such as, for instance, a single outlet manifold, a plurality of outlet manifolds, a single inlet manifold, or a plurality of inlet manifolds. In embodiments, a plurality of inlet conduits 24 can connect the inlet manifold 22 one or more to of the pumping units 40. In addition, a plurality of outlet conduits 26 can connect the plurality of pumping units 40 to the outlet manifold 100.

Each pumping unit 40 can include a pump 44 driven by a driver 42 (which may be referred to herein as a "prime mover"). Pump 44 may include any suitable fluid pumping device or assembly for pressurizing the fracturing fluid (with or without proppant and/or other additives entrained therein) to the pressures associated with a hydraulic fracturing operation. For instance, in some embodiments, the pump 44 may be configured to pressurize the fracturing fluid (again, with or without proppant and/or other additives entrained therein) to a pressure of about 9000 pounds per square inch (psi) or higher and may be referred to herein as a "hydraulic fracturing pump" 44. In some embodiments, pump 44 may include a positive displacement pump, centrifugal pump, or other suitable pump types. Driver 42 may include any suitable motor or engine that is configured to drive or actuate the corresponding pump 44 during operations. For instance, in some embodiments, driver 42 may include a diesel engine, a turbine (such as a gas turbine, steam turbine, or other types of turbines as will be understood by those skilled in the art), an electric motor, or some combination thereof. During operations, within each pumping unit 40, the driver 42 may actuate the pump 44 to draw fracturing fluid into the pump 44 via the corresponding inlet conduit 24 and to pressurize and output the fracturing fluid from the pump 44 via the corresponding outlet conduit 26.

During a hydraulic fracturing operation, a pressurized fracturing fluid is pumped from the pumping units 40 to the manifold assembly 20, generally being received by the outlet manifold 100 via the outlet conduits 26. The outlet manifold 100 directs the pressurized fracturing fluid toward the wellhead 102 for injection into the subterranean formation 103 as previously described. The fracturing fluid further may be emitted from the wellbore via the wellhead 102 and recycled back to the storage vessels 12 through one or more recycle conduits 16. In some embodiments, the fracturing fluid output from the wellhead 102 may be routed through one or more filtering or separation assemblies or devices (not shown) to remove additives, proppant, and/or other fluids or solids (such as, rock chips, formation fluids, etc.) that may be entrained within the fracturing fluid, prior to recycling the fracturing fluid to the storage vessels 12.

Figure 2A:
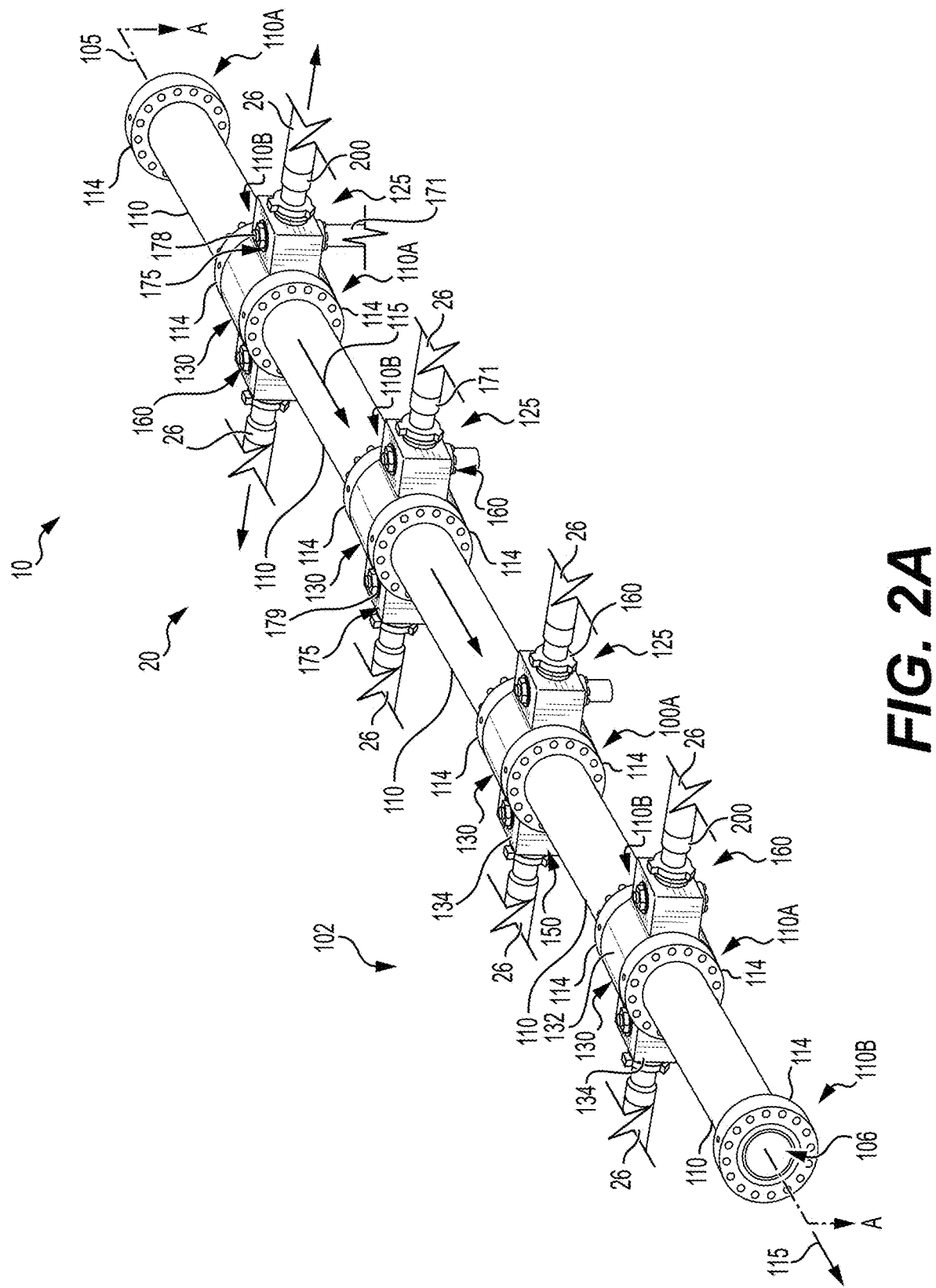
FIG. 2A is a perspective view of an example embodiment of a manifold of the hydraulic fracturing system of FIG. 1, including a series of integrated flow junction and check valve assemblies in accordance with the principles of the present disclosure.
Figure 2B:
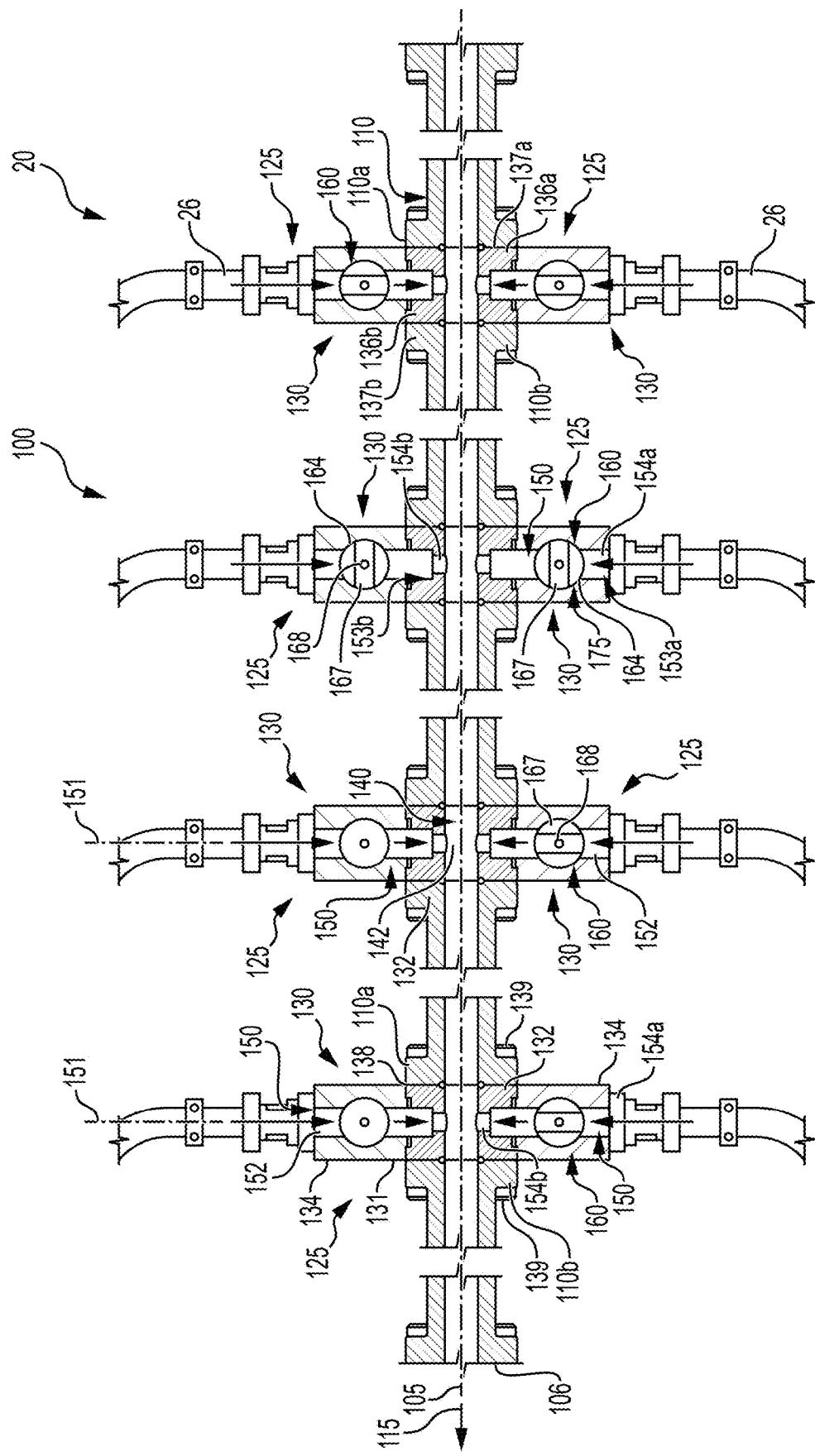
FIG. 2B is a sectional view of the manifold assembly of FIG. 2A, as viewed from the top thereof, illustrating the series of manifold sections with integrated flow junction and check valve assemblies located therebetween in accordance with the principles of the present disclosure.
Figure 2C:
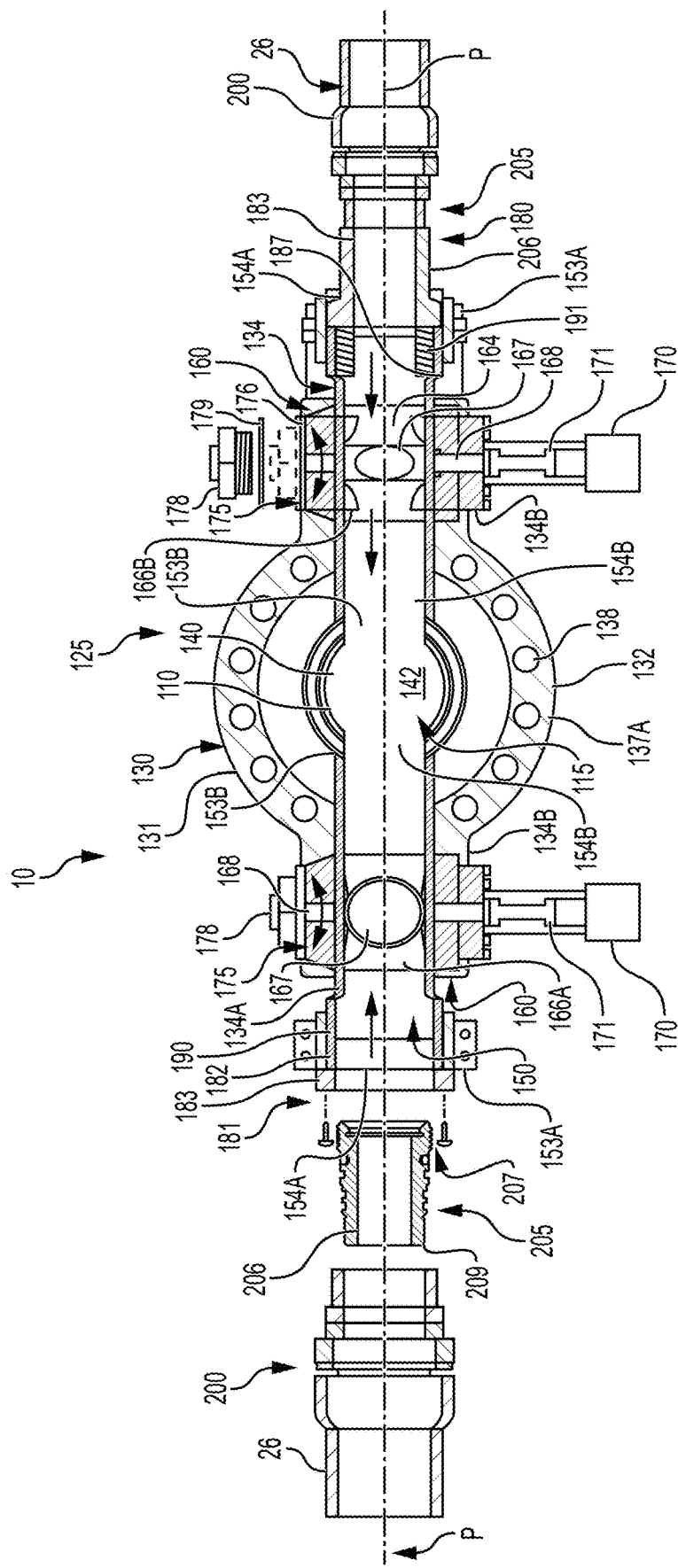
FIG. 2C is an end sectional view of the manifold assembly of FIG. 2A, illustrating an example embodiment of an integrated flow junction and check valve assembly in accordance with the principles of the present disclosure.

An example embodiment of a manifold (by way of example, an outlet manifold 100 hereafter referred to as a "manifold") of manifold assembly 20, including a plurality of integrated flow junction and check valve assemblies 125 is shown in FIGS. 2A-2C and is described in more detail below. While embodiments of the integrated flow junction and check valve assemblies 125 are shown and described with respect to an outlet manifold of the hydraulic fracturing system 10, it will, however, be understood that the integrated flow junction and check valve assemblies 125 further can be used with an inlet manifold, or with other fracturing system equipment of the hydraulic fracturing system 10, including frac trees, zipper modules, etc.

As shown in FIGS. 2A-2B, in embodiments, the manifold 100 can include an elongate fluid conduit having a fluid flow passage 115 defined therethrough and extending along a longitudinal central axis 105, a first or upstream end 100a, and a second or downstream end 100b opposite the upstream end 100a. As used herein, the terms "upstream" and "downstream" denote a general flow direction of fracturing fluid during hydraulic fracturing operations, according to some embodiments. As further shown in FIG. 1, in embodiments, an outlet 106 can be positioned at the downstream end 100b that is fluidly connected to the wellhead 102.

In addition, as shown in FIGS. 2A-2B, the manifold 100 can include a plurality of tubular manifold sections 110 and a plurality of integrated flow junction and check valve assemblies 125 interleaved between the plurality of manifold sections 110 and arranged in line with the manifold sections along the longitudinal central axis 105.

In embodiments, the manifold sections 110 can include elongate tubular members that are coaxially aligned along the longitudinal central axis 105 of the manifold. Each manifold section 110 can include a first or upstream end 110A, a second or downstream end 110B opposite upstream end 110A, and a throughbore extending axially between the ends 110A, 110B. Some of the ends 110A, 110B can be connected to junction 130 along outlet manifold 100. For instance, one or more of the ends 110A, 110B of each manifold section 110 may be connected to a corresponding, axially aligned integrated flow junction and check valve assembly 125 via flanges 114, although other connection mechanisms also are contemplated (e.g., a threaded connections, clamped connections, welded connections, or other types of connections as will be understood by those skilled in the art).

As shown in FIGS. 2A-2B, integrated flow junction and check valve assemblies 125 generally will be axially spaced along the longitudinal axis 105 and axially interleaved between the plurality of manifold sections 110 as previously described. During hydraulic fracturing operations, the integrated flow junction and check valve assemblies 125 can provide a plurality of fluid inlets for the pressurized fracturing fluid to enter the manifold 100. In embodiments, each integrated flow junction and valve assembly 125 includes a central axis 126 that is aligned with the longitudinal axis 105 of the manifold when junction and valve assembly 125 is connected within the manifold 100.

As illustrated in FIGS. 2A-4G, integrated flow junction and check valve assemblies 125 will include a junction 130 having a body 131 with one or more valves 160 (e.g., check valves) integrated internally therein. The various embodiments of the integrated flow junction and check valve assemblies of the present disclosure are adapted to substantially reduce and/or, in some embodiments, eliminate a number of points of failure that can occur a fluid connections between hoses or other fluid conduits and the junctions and/or check valves of a hydraulic fracturing system.

FIGS. 2C-4G show different example embodiments of integrated cross how flow junction and check valve assemblies 125 according to the principles of the present disclosure. As shown in FIGS. 2C-4G, the body 131 of the cross flow junction 130 can have a variety of configurations, including comprising a valve tee with multiple valves integrated therein. For example, as illustrated in FIGS. 4B, 4F, and 4G, in embodiments, the body 131 of the junction 130 can be configured a single side portion 134 with one or more inlet bores defined therethrough, while in some embodiments, the junction can includes a cross flow junction having a pair of opposite extending side portions 134, each with an inlet bore extending therethrough, and/or 3-way, 4-way, or 5-way junctions. In addition, the body 131 can be configured as a 7" 15K block (e.g., with a 7" throughbore), a 5"15 K block (e.g., having a 15" throughbore), or other size block depending on the application thereof.

In embodiments, the body 131 of the junction 130 of each integrated flow junction and check valve assembly 125 will include a central portion 132 and one or more radially projecting side portions 134. In embodiments, the central portion 132 and side portions 134 can be formed together as part of a unitary body structure, while in other embodiments, the side portions can be fixed connected to the central portion to form a substantially integrated unitary structure therewith.

As illustrated in FIGS. 2C-4A, and 4C-4E, in some embodiments, the junction 130 of each the integrated flow junction and check valve assembly 125 can include a cross flow junction having two or more side portions 134 for supplying the pressurized fluid to the manifold from both sides thereof. In other embodiments, such as shown in FIGS. 4B, 4F, and 4G, the junctions 130 can be formed with the single side portion 134, such as for applications where the pressurized fracturing fluid is to be supplied from only one side of the manifold 100.

As illustrated in FIGS. 2A and 2B, in embodiments, the central portion 132 of the body 131 of the junction 130 can have a first or upstream end 136A having a first facing surface 137A and a second or downstream end 136B having a second facing surface 137B. The upstream and downstream facing surfaces 137A and 137B can be substantially flat and further can include a plurality of studded openings 138 spaced thereabout. The upstream and downstream facing surfaces of the central portion can engage and seat against corresponding flanges 114 of the first and second or upstream and downstream manifold sections 110A and 110B can be secured to the manifold sections with studs or other fasteners 139 that can be inserted into fastener openings 138 in the flanges 114 and into the openings 138 along the upstream and downstream facing surfaces 137A and 137B of the central portion to securely mount the integrated flow junction and check valve assembly between the adjacent manifold sections.

As illustrated in FIGS. 2C-3B, in embodiments, the central portion 132 of each junction 130 further will include a throughbore 140 extending therethrough. The throughbore 140 generally will be aligned with the fluid flow passage 115 and the longitudinal central axis 105 of the manifold 100 when the integrated flow junction and check valve assembly is installed between adjacent manifold sections. In addition, in embodiments, a chamber 142 can be defined along the throughbore 140. During a fracturing operation, a flow of the pressurized fracturing fluid generally will be received through one or more inlet bores 150 of the integrated flow junction and check valve assemblies through the chamber and into the manifold 100, where it generally will be directed along the fluid flow passage 115 of the manifold 100 for delivery of the pressurized fracturing fluid to the wellhead 102.

In addition, in some embodiments, such as when the junction 130 is formed with only one side portion 134, the central portion 132 of the junction can be unequally studded along the upstream and downstream facing surfaces 137A/137B thereof. In embodiments, single sided integrated flow junction and check valve assemblies can be mounted with their side portions extending opposite one another (e.g., single sided integrated flow junction and check valve assemblies could be mounted adjacent one another along the manifold, with the side portions thereof extending in opposite radial directions).

Still further, in some embodiments, a series of single sided integrated flow junction and check valve assemblies can be arranged along the manifold, with the side portions thereof facing in a same directions. In such embodiments, the spacing at the studded openings about the upstream and downstream facing surfaces of the opposite facing integrated flow junction and check valve assemblies can be offset or otherwise arranged to enable such adjacent integrated flow junction and check valve assemblies to each be secured to the upstream and downstream flanges of the adjacent manifold sections 110A and 110B.

In addition, the junctions 130 of the integrated flow junction and check valve assemblies 125 can include bodies having different configurations, including round and/or various polygonal shapes. For example, as shown in FIGS. 2C-4B, in embodiments, the central portion 132 of the junction can have a generally round or cylindrical configuration, while in other embodiments, such as shown in FIGS. 4C-4G, the central portion can have a generally square, rectangular, or trapezoidal configuration of shape. Other configurations also can be provided.

As illustrated in FIGS. 2C-3B, in embodiments, each side portion or side portions 134 further will include one or more inlet bores 150 that extends along a bore axis 151 through the side portion from a first end 153A having an inlet opening 154A at a distal or outer end of the side portion to a second end 153B terminating at an outlet opening 154B. The outlet opening 154B of the one or more inlet bores 150 is open to and in fluid communication with the chamber located along the chamber of the throughbore of the central portion of the body to discharge the pressurized fluid into the manifold.

As further illustrated in FIGS. 2C-3A, in embodiments, the side portions 134 of the junction each integrated flow junction and check valve assembly each generally will include a valve such as a check valve 160 within the junction. For example, as indicated in FIG. 3A, in embodiments, the check valves 160 generally will be located internally within the side portions of their junctions and along each inlet bore thereof such that a valve bore or passage thereof will be aligned with the inlet bore extending through the side portion. In addition, in some embodiments, multiple (e.g., two or more) check valves can be located along either side of a junction of an integrated flow junction and check valve assembly. In addition, while the valves are shown and discussed herein as comprising check valves, it will be understood that, in other embodiments, other types of valves also can be used.

Figure 3B:
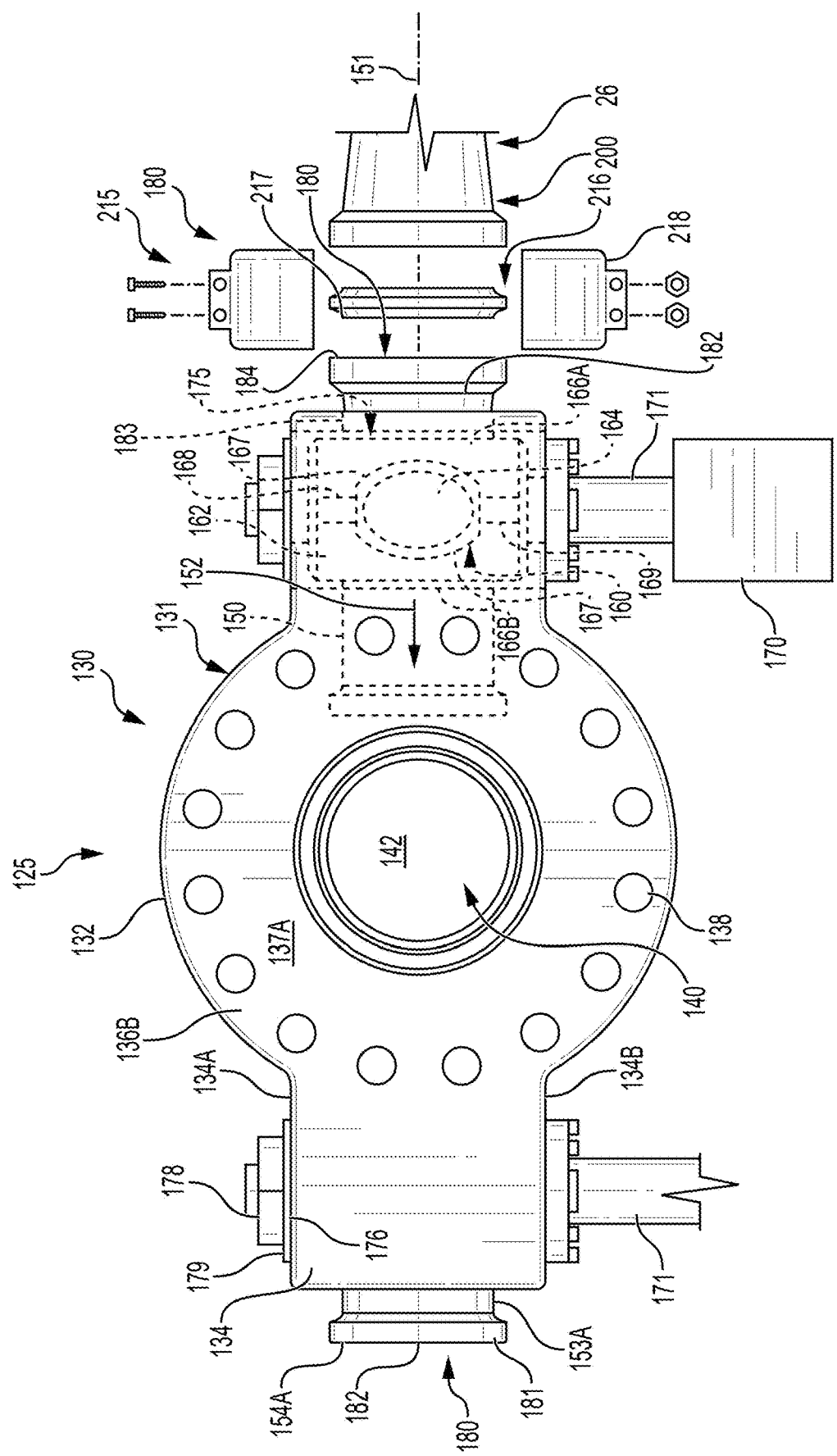
FIG. 3B is a side elevational view of an embodiment of an integrated flow junction and check valve assembly such as shown in FIG. 3A, illustrating an additional embodiment of a connection between the integrated flow junction and check valve assembly and a fluid conduit in accordance with the principles of the present disclosure.

As shown in FIGS. 20-3B, in embodiments, the check valve 160 can include a body 162 received and internally located within the side portion in a position intersecting the inlet bore 150. The valve body 162 generally will include a valve passage 164 that will be aligned with the bore axis 151 and with the inlet flow path 152 of the inlet bore 150, extending through body 162 of the check valve 160 from an upstream or inlet end 166A to a downstream or outlet end 166B. The check valve 160 further will include a valve disk 167 positioned within the valve passage and connected to a valve stem 168 or rotatable shaft that rotated the valve into and out of engagement with a valve seat 169 (FIG. 2C). In some embodiments the valve seat 169 can include a sealing ring or gasket located along a one or both side portions thereof.

In embodiments, such as indicated in FIG. 3A, the valve stem can extend through the lower surface 134B of side portion along which the check valve 160 is located and can be connected to an actuator 170. In embodiments, the valve stem can extend through a bushing and/or seal. In embodiments, the actuator 170 can include a hydraulic or electric motor or other, similar actuator, and will be operable to drive rotation of the valve stem 168 to rotate or reorient the valve disk 167 between an open position such as indicated the right side of FIG. 2C and a closed position as indicated on the left side of FIG. 2C.

In the open position, the valve disk will be oriented such that the valve passage is substantially opened to allow the pressurized fluid to flow through the valve to the outlet opening of the inlet bore where it can be introduced into the fluid flow passage of the manifold. In the closed position, the valve disk 167 is rotated so as to engage and seat against the valve seat to substantially seal the valve passage 164 so as to block the pressurized fluid from flowing through the inlet bore to its outlet opening and into the fluid flow passage of the manifold. In addition, the check valve 160 can further operate to block a backflow of the pressurized fluid along the inlet bore 150.

In addition, as shown in FIGS. 2C-3B, the check valve 160 can be received within a cross bore 175 that extends transversely through the side portion 134, from the upper surface 134A to the lower surface 134B of the side portion 134. In embodiments, the check valve generally will be received and seated at an intersection between the cross bore and inlet bore. As further indicated in FIGS. 2C-3A, the cross bore 175 can be sized and configured to enable the check valve 160 to be inserted and/or removed from the side portion through cross bore 175.

In addition, the upper end of the cross bore can include an access opening 176 configured to enable access to the check valve such as for servicing and/or replacement of the check valve as a unit or individual components thereof. The access opening 176 further can be sealed with a cover or cap that can be inserted into the access opening and secured therein, such as by a threaded connection. In embodiments, a sealing ring 179 can also be engaged between the cap 178 and the cross bore 175 (e.g., against a shoulder formed along the cross bore) to create a substantially pressure tight seal when engaged within the access bore. Still further, in some embodiments, the valve stem 169 could include a manually operable handle enable operation of the check valve instances where the actuator is disconnected or disabled.

In addition, as shown in FIGS. 2C-3B, 4B, 4C, and 4F, in some embodiments, the side portions 134 of the integrated flow junction and check valve assemblies can be oriented or positioned such that a bore axis 151 of their inlet bores 150 and the check valves 160 positioned along each of the inlet bores will be located along a substantially horizontally extending plane "P" (FIG. 2C) extending through the central portion of the junction and transversely to the longitudinal axis of the manifold. As a result, the pressurized fluid can be received along the horizontal plane directly from a fluid conduit 26 such as a hose or flow line.

In other embodiments, the inlet bores 150 of the integrated flow junction and check valve assemblies 125 can extend radially away from the central portion at an angle with respect to the horizontal plane extending through the central portion of the junction (e.g., at a downward angle as shown in FIGS. 4A and 4E). In other embodiments, the inlet bores 150 of the integrated flow junction and check valve assemblies 125 can be oriented so as to extend at an upward angle.

Still further, in some embodiments, such as illustrated in FIGS. 5A-5B, the integrated flow junction and check valve assemblies 125 that include multiple check valves 160 located along inlet bores 150 that are located along a same horizontal plane P extending through the junction body and intersect with the main bore of the manifold 100 defining the fluid flow passage 115 at an angle with respect to the longitudinal axis 105 of the manifold 110. For example, as shown in FIG. 5A, in some embodiments, the junction 130 can be configured with two (or more) inlet bores 150 with check valves 160 integrally located therealong, and which are oriented so as to enter and extend through the body of the junction at an angle.

FIG. 5B shows a further example embodiment in which three inlet bores 150, each with an integrated check valve 160 positioned along the length thereof between an inlet opening 154*a* at which a fluid conduit 26 is connected and an outlet opening 154*b* that opens into and is in fluid communication with the fluid flow passage defined by the manifold 100. In this embodiment, one of the inlet bores 150 is shown as being arranged so as to enter the block substantially parallel to the longitudinal axis 105 of the manifold, with two additional or outer inlet bores 150*b*/150*c* being arranged at an angle with respect to the centrally located or longitudinally aligned inlet bore 150*a*.

The check valves 160 thus can be located at any angle with respect to a horizontal plane P extending through the body of the junction, including various vertically extending (e.g., upward and downward) angles such as shown in FIGS. 4A and 4E. By way of example, in some embodiments, such as for a 7" 15K junction configuration, the check valve(s) 160 can be located and/or oriented at various angles above and/or below a horizontal plane P defined through the at increments of about 22.5 degrees from the horizontal plane, or for a 5" 15K junction configuration, the check valves can be located at various angles in increments of 30 degrees from the horizontal plane.

In addition, in embodiment, such as shown in FIGS. 5A-5B, the inlet bores can be oriented along a same horizontal plane at various angles ranging approximately 0 deg. to approximately 90 deg. with respect to the longitudinal axis 105 of the manifold. For example, as shown in FIG. 5B, in embodiments, the junction can include a centrally located bore 150*a* can be located in substantial alignment with and extending parallel to the longitudinal axis 105. In embodiments, the junction can include angled bores 150*a*/150*b* that can be oriented at and can extend through the body of the junction at an angle of approximately 30 deg. to approximately 45 deg. Other angles also can be provided.

It will be understood that the inlet bores can be arranged at a variety of different angles, and that it may be possible to include multiple inlet bores each extending at a different angle with respect to the longitudinal axis 105, and in embodiments, the inlet bores can be oriented at different elevations and can extend diagonally through the body of the junction from the inlet end to the outlet end for delivery of the pressurized fluid into the manifold. In embodiments, the angle(s) at which the inlet bores are formed and extend through the body of the junction can be selected based on various factors such as space constraints, the size of the manifold along which the junction is located, fluid pressures, the size of the junction(s) and other factors. For example, in some fracturing system applications, such as where available space is more limited, or where a smaller manifold is used, the junctions can be configured with one or more inlet bores extending at an angle of about 30 deg. to 90 deg., and in embodiments, at an angle of about 45 deg. to 60 deg.; while in other embodiments, where a larger junction is needed an/or can be accommodated, the inlet bore(s) can be oriented at an angle of about 60 deg. to about 90 deg. Other angles also can be provided.

Further, in various embodiments, single sided, unequally studded Integrated flow junction and check valve assemblies could be mounted together, and each check valve be set at a selected increment angle. For example, FIGS. 5A-5B illustrate embodiments of integrated flow junction and check valve assemblies 125 that include multiple check valves 160 located along inlet flow bores 150 that are located along a horizontal plane P extending through the junction body and intersect with the main bore of the manifold 100 defining the fluid flow passage 115 at an angle. In some such embodiments, the inlet bores can be arranged along 1 side of the junction body, along two sides of the junction body, or along 3 or more sides of the junction body (e.g., along an upstream and lateral sides of the junction); and in still further embodiments, one or more of the inlet bores can be located at a different elevation than the other bore(s) of the junction.

The integrated flow junction and check valve assemblies of the present disclosure thus can be configured with streamlined shapes or designs, which can enable a significant reduction in size and weight for the junctions and the manifold overall. For example, in embodiments, the length of the crosswise extending side portions 134 of the integrated flow junction and check valve assemblies potentially can be reduced from about 19.875" to possibly as low as approximately 4.57"-4.0".

Still further, the integrated flow junction and check valve assemblies 125 will include connector assemblies 180 configured to connect to various types of fluid connections, for example, a 3" API, 1502, Hub-D, or other connections, or combinations thereof. In some embodiments, the connector assemblies 180 can be configured to connect to different types and/or sizes of fluid connections, and/or can include or be configured to receive and couple to a connector adapter that can enable connections to different types of fluid connectors. Thus, embodiments of the integrated flow junction and check valve assemblies 125 and the connector assemblies 180 thereof can provide increased stability of the connections to the pressurized fluid conduits, reduce, or substantially eliminate potential points of failures, as well as facilitating quick replacement in the event of a failure so as to minimize stoppage time.

For example, as shown in FIGS. 2C-3B, the integrated flow junction and check valve assemblies 125 further will include a connector assembly 180 configured to link the check valves 160 thereof to a fluid conduit coupler 200 and a fluid conduit 26. In embodiments, the fluid conduit 26 will include a frac hose or other flowline for supplying the pressurized fracturing fluid F to the manifold 100 from a pumping unit 40 (FIG. 1).

In embodiments such as indicated in FIGS. 2C and 3A, the connector assembly 180 can include a fluid connector 181. In embodiments, the fluid connector 181 can include a substantially one-piece body 182 having first portion 183 and a second portion 184. In some embodiments, the first and second portions 183 and 184 can include separate components that can be mated together to form the body.

In embodiments, the first portion 183 can include an elongated tubular body or sleeve that will be received within the inlet end 153A of the inlet bore 150. In embodiments, the first portion 183 generally will be inserted into the inlet bore 150 along a length thereof such that a downstream end 186 of the fluid connector 181 generally will be located in abutment with the check valve 160. For example, as shown in FIG. 2C, the downstream end 186 can be positioned in fluid communication with the upstream end of the valve passage 164, and in embodiments, can engage and bear against a shoulder 187 defined along the inlet bore 150 adjacent the intersection of the inlet bore 150 and cross bore 175. In addition, a sealing ring or gasket 188 can be positioned between the downstream end 186 of the fluid connector 181 and the shoulder 187 to seal the area of engagement 189 between the upstream end 166A of the valve passage 164 and the downstream end 186 of the fluid connector.

In embodiments, such as shown in FIG. 3A, the first portion 183 of the body 182 of the fluid connector 181 can include an internal bore 190 and a threaded connection 191 formed about an outer wall of the first portion. The threaded connection 191 of the first portion 183 generally will be configured to engage a corresponding threaded connection 192 formed along the inlet bore 150 at the inlet end 153 thereof. As further illustrated in FIG. 3A, the first portion can be received within the inlet end 153 of the inlet bore 150 with its threaded connection 191 threadably engaging the corresponding threaded connection 192 within the inlet bore 150 to secure the fluid connector 181 within the inlet bore 150, with the second portion 184 of the fluid connector 181 generally engaging the outer side wall of the junction, as indicated in FIG. 3A. Other connection devices (e.g., a friction or compression fitting arrangement, or other connection devices as will be understood by those skilled in the art) also can be used. The fluid connector 181 thus can include a removable connector member that can be removable and replaceable so as to enable different fluid connectors configured to engage and connect with other different interfacing fluid connectors (e.g., a 3" API, 1502, Hub-D, or other connections, or combinations thereof) as will be understood by those skilled in the art.

In some embodiments, the second portion 184 of the fluid connector 181 can include a flange 193 having a series of spaced openings 194 formed therethrough. The fluid conduit coupler 200 of the fluid conduit 26 can include a corresponding flange 201 having a series of spaced openings 202 formed therethrough. The flange 201 of the fluid conduit coupler 200 can be brought into engagement with the flange 193 of the fluid connector 181, with the openings 194 and 202 of the flanges aligned, and studs, bolts, or other fasteners to secure the fluid conduit 26 to the integrated flow junction and check valve assembly 125. In addition, in embodiments, one or more seals 196 (e.g., sealing rings, gasket, or the like) can be positioned between the flanges of the fluid connector 181 and the fluid conduit coupler 200 to seal the connection therebetween.

In other embodiments, the connector assembly 180 further can include an adapter 205 (FIG. 3A) that can be received within the inlet bore or can be received within the bore 190 of the first portion 183 of the fluid connector 181. For example, in embodiments, the adapter can include a body 206 that can be formed as a sleeve with a first end 207 configured to insert into the or be received over the first portion of the fluid connector 181 or the inlet end 153A of the inlet bore 150, such as illustrated in FIG. 3A. In embodiments, the first end 207 can have a connection device such as a plurality of threads formed about an internal or external wall, and which can engage corresponding threads of the fluid connector or the inlet bore. Other connections also can be used, such as a friction fitting, or other connections as will be understood by those skilled in the art.

The second end 209 of the adapter can include a flange that can be configured to mate with a correspondingly sized fluid conduit coupler 200 (e.g., a 3" API, 1502, Hub-D, or other connections, or combinations thereof) of the fluid conduit. The flange can include openings that can be aligned with corresponding openings of the flange of the fluid conduit coupler 200, with studs, bolts, or other fasteners received therethrough, to connect the fluid connector to the fluid connection of the fluid conduit 26. In addition, seals such as gaskets or sealing rings 211 can be received between the adapter and the fluid connector 181 and the fluid conduit coupler 200 to seal the connections therebetween.

In still other embodiments, the connector assembly 180 can further include a clamp assembly 215 (FIG. 3B). As generally illustrated in FIG. 3B, the clamp assembly 215 can include one or more hubs or adapter sections 216, one or more seals 217 (e.g., a sealing ring, gasket, or other seals as will be understood by those skilled in the art) and a pair of opposing clamps 218. In some instances, the one or more hubs 216 can include a proximal or first portion 216A configured to fit within a bore defined within the fluid connector 181 or fluid conduit coupler 200 in a seated, substantially sealed engagement. The seal ring 217 can be positioned between a distal or second end 216B of the hubs when the bubs are brought into facing contact as indicated in FIG. 3B to create a seal between the distal ends of the hubs. Alternatively, in some embodiments such as where a single hub or adapter section is used, a seal can be applied between a distal end of the hub and the fluid connector 181 and/or the fluid conduit coupler 200 as will be understood by those skilled in the art.

As further illustrated in FIG. 3B, after the fluid connector 181 of the integrated flow junction and check valve assembly 125 and the fluid conduit coupler 200 of the fluid conduit 26 are engaged with the hub(s) therebetween, the clamps 218 can be applied about the area of engagement between the fluid connector 181 and the fluid conduit coupler 200 and secured with fasteners such as blots, stubs, or the like. The hub(s) further can be exchanged for different size or configuration hubs as needed to accommodate the connection of the fluid connector assembly 180 of the integrated flow junction and check valve assembly 125 to different size and/or types of fluid conduit couplers 200.

By substantially locating the fluid connector 181 within the body of the junction of the integrated flow junction and valve assembly (e.g., being substantially internally mounted within the junction to be connected to/linked with the internally mounted check valve 160) can help support and stabilize the connection between the reduce or minimize a point of potential failure enables the internal check valve of the integrated flow junction and check valve assembly and the fluid conduit. For example, moving the connection to the check valve internally can eliminate one or more of connections previously required between the check valve and the junction and/or the fluid conduit supplying the pressurized fluid. In addition, the direct connection can facilitate the connection and disconnection of the fluid conduits (e.g., frac hoses) to the manifold, as well as, in embodiment, the change-out of the fluid connector of the connector assembly as needed helping save time and labor.

The embodiments disclosed herein include integrated flow junction and check valve assemblies for a manifold of a hydraulic fracturing system that each include a junction with one or more check valves integrated internally therein. In various embodiments, the junction can include one or more internally located check valve, two or more internally located check valves mounted on either side of the junction, or a conventional valve tee with a series of valves integrated therein. The foregoing and various other embodiments of the integrated flow junction and check valve assemblies of the present disclosure thus are adapted to substantially reduce and/or, in some embodiments, eliminate a number of points of failure between the fluid connectors and the junctions and/or check valves of a hydraulic fracturing system.

It should be appreciated that embodiments of the integrated flow junction and check valve assemblies may be utilized in other fluid services other than hydraulic fracturing operations. For instance, embodiments of the integrated flow junction and check valve assemblies disclosed herein may be utilized in fluid manifolds, lines, or other fluid conveyance systems and devices for transporting pressurized fluids both inside and outside of the oil and gas industry. Some particular examples include the use of embodiments of the integrated flow junction and check valve assemblies disclosed herein for flowing fluids for other oilfield operations (such as pump down, drilling mud delivery, production operations, or other operations as will be understood by those skilled in the art). In addition, it is also contemplated that embodiments of the integrated flow junction and check valve assemblies disclosed herein may be used in other fluid services, including those outside of the oil and gas industry.

The preceding discussion is directed to various exemplary embodiments. However, one of ordinary skill in the art will understand that the examples disclosed herein have broad application, and that the discussion of any embodiment is meant only to be exemplary of that embodiment, and not intended to suggest that the scope of the disclosure, including the claims, is limited to that embodiment.

This application claims priority to and the benefit of U.S. Provisional Application No. 63/778,733, filed Mar. 27, 2025, titled "INTEGRATED JUNCTION AND CHECK VALVE ASSEMBLIES FOR HYDRAULIC FRACTURING SYSTEM MANIFOLDS AND RELATED METHODS," and U.S. Provisional Application No. 63/771,784, filed Mar. 14, 2025, titled "INTEGRATED JUNCTION AND CHECK VALVE ASSEMBLIES FOR HYDRAULIC FRACTURING SYSTEM MANIFOLDS AND RELATED METHODS," the disclosures of which are incorporated herein by reference in their entireties. This application is also a continuation-in-part of U.S. Non-Provisional application Ser. No. 29/990,251, filed Feb. 20, 2025, titled "CROSS FLOW MANIFOLD JUNCTION," and U.S. Non-Provisional application Ser. No. 29/990,254, filed Feb. 20, 2025, titled "CROSS FLOW MANIFOLD JUNCTION," the disclosures of which are incorporated herein by reference in their entireties.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

The invention claimed is:

1. A manifold of a hydraulic fracturing system comprising:
    a plurality of manifold sections; and
    one or more junctions positioned between adjacent manifold sections, the one or more junctions including:
        a body comprising:
            an upstream end configured to connect with a first manifold section,
            a downstream end spaced from the upstream end and configured to connect to a second manifold section, and
            a throughbore extending longitudinally between the upstream end and the downstream end, so that when the junction is installed between the first and second manifold sections, the throughbore is axially aligned with a fluid flow passage of the manifold,
        one or more inlet bores extending axially through the body from a first end having an inlet opening located along a distal end of a side portion of the body to a second end having an outlet opening in communication with the throughbore, so that when a pressurized fluid is received through the inlet opening and is directed along the one or more inlet bores to the outlet opening for introducing the pressurized fluid into the fluid flow passage of the manifold, and
        one or more check valves internally mounted within the side portion of the body along the one or more inlet bores so as to be integrated within the body of the junction and configured to restrict a flow of the pressurized fluid along the one or more inlet bores.

2. The manifold of claim 1, further comprising a fluid connector including a first portion configured to be received within the one or more inlet bores upstream from the one or more check valves, and a second portion located outside of the one or more inlet bores and configured to connect to a fluid connector of a fluid conduit.

3. The manifold of claim 2, wherein the second end of the fluid connector comprises a connector adapter configured to releasably engage the first portion of the fluid connector; and wherein the second portion is removable and replaceable so as to enable connection of the first portion to one or more of a 3" API connector, a 1502 connector, a Hub-D connector, or a combination thereof.

4. The manifold of claim 2, wherein the first end of the fluid connector is threadedly engaged within the one or more inlet bores.

5. The manifold of claim 2, wherein the second end of the fluid connector comprises one or more of a hub connector, a studded connector, a threaded connector, or a flanged connector.

6. A junction for a manifold of a hydraulic fracturing system, the system comprising:
    a body including:
        (a) a central portion having a longitudinally extending throughbore positioned in communication with a fluid flow passage extending through the manifold and along which a fluid is transported;
        (b) one or more side portions extending radially from the central portion, the one or more side portions including one or more inlet bores extending therethrough, the one or more inlet bores configured to define a flow path extending between an inlet in communication with the throughbore and an outlet at a terminal end of the one or more side portions and along which at least a portion of the fluid is directed away from the manifold; and one or more check valves positioned along the one or more inlet bores and integrated within the body, the one or more check valves configured to substantially restrict a backflow of the fluid passing through the one or more inlet bores.

7. The junction of claim 6, wherein the one or more side portions comprises a plurality of side portions extending radially from the central portion, each of the plurality of side portions including an inlet bore extending therethrough, and one or more valves internally located along the inlet bore of each of the plurality of side portions so as to be integrated within the side portion.

8. The junction of claim 6, wherein the central portion of the body is configured to couple to one or more manifolds, with the throughbore of the central portion aligned with the fluid flow passage of the manifold.

9. The junction of claim 6, wherein the one or more inlet bores extends downwardly at an angle with respect to a horizontal plane extending through the central portion.

10. The junction of claim 6, wherein the junction comprises a cross flow junction having at least two side portions, each side portion including an inlet bore extending therethrough, and wherein one or more of the at least two side portions extend radially from the central portion at an angle with respect to a horizontal plane extending through the central portion.

11. The junction of claim 6, further comprising one or more cross bores located along the one or more side portions of the body and including one or more access ports, and wherein the one or more cross bores extends transversely through the one or more side portions and configured to enable access to the one or more check valves.

12. The junction of claim 6, further comprising a fluid connector positioned at the terminal end of the one or more side portions, and wherein the fluid connector is configured to enable connection of the one or more check valves located within the one or more side portions to one or more of a 3" API connector, a 1502 connector, a Hub-D connector, or a combination thereof.

13. A hydraulic fracturing system comprising:
a manifold assembly including one or more manifolds having a fluid flow passage defined therethrough and along which a pressurized fracturing fluid is transported;
a series of junctions located along the one or more manifolds, each junction including:
a body including a throughbore aligned with and in fluid communication with the fluid flow passage of the one or more manifolds;
one or more inlet bores extending radially with respect to a longitudinal axis of the one or more manifolds through the body and away from the throughbore, the one or more inlet bores defining an inlet flow path extending from an inlet opening located along an outer surface of the body through the body and to an outlet opening located at the throughbore, so that when a flow of the pressurized fracturing fluid is received through the inlet opening and is directed toward the outlet opening for introduction of the pressurized fracturing fluid into the one or more manifolds; and
one or more valves positioned along the one or more inlet bores, integrated within the body, and operable to regulate the flow of the pressurized fracturing fluid passing along the one or more inlet bores.

14. The hydraulic fracturing system of claim 13, wherein the one or more valves is oriented at an angle with respect to the longitudinal axis of the one or more manifolds.

15. The hydraulic fracturing system of claim 13, wherein each junction comprises a cross flow junction having two or more side portions each extending in a crosswise direction with respect to the one or more manifolds, each of the two or more side portions including an inlet bore extending therethrough and along a body region in which the one or more valves is located.

16. The hydraulic fracturing system of claim 15, wherein each of the one or more valves comprises a check valve positioned along each inlet bore of each of the side portions, each check valve of the one or more valves being integrated within one of the side portions.

17. The hydraulic fracturing system of claim 16, further comprising a cross bore located along each side portion and extending transversely through the side portion, the cross bore including an access opening configured to enable access to the check valve positioned along the inlet bore.

18. The hydraulic fracturing system of claim 13, further comprising a fluid connector at least partially positioned within one or more inlet bores adjacent the one or more valves, and wherein the fluid connector is configured to enable connection of the one or more valves to one or more of a 3" API connector, a 1502 connector, a Hub-D connector, or a combination thereof.

* * * * *